US012631858B2

(12) United States Patent
Ohtake

(10) Patent No.: US 12,631,858 B2
(45) Date of Patent: May 19, 2026

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Fumiaki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 960 days.

(21) Appl. No.: 17/788,261

(22) PCT Filed: Nov. 11, 2020

(86) PCT No.: PCT/JP2020/042053
§ 371 (c)(1),
(2) Date: Jun. 22, 2022

(87) PCT Pub. No.: WO2021/131370
PCT Pub. Date: Jul. 1, 2021

(65) Prior Publication Data
US 2023/0052696 A1     Feb. 16, 2023

(30) Foreign Application Priority Data

Dec. 23, 2019     (JP) ................................. 2019-231281

(51) Int. Cl.
*G02B 15/14* (2006.01)
*G02B 15/15* (2006.01)
(Continued)

(52) U.S. Cl.
CPC ......... *G02B 15/1461* (2019.08); *G02B 15/15* (2013.01); *G02B 15/20* (2013.01); *G02B 15/22* (2013.01)

(58) Field of Classification Search
CPC .......... G02B 9/64; G02B 13/02; G02B 13/22; G02B 15/163; G02B 15/1461; G02B 15/15; G02B 15/20; G02B 15/22
See application file for complete search history.

(56) References Cited

U.S. PATENT DOCUMENTS

2014/0218808 A1* 8/2014 Ogata .................. G02B 15/163
359/695
2015/0168697 A1 6/2015 Ogata
(Continued)

FOREIGN PATENT DOCUMENTS

JP     2015-118127 A     6/2015
JP     2016-024341 A     2/2016
(Continued)

OTHER PUBLICATIONS

International Preliminary Report on Patentability from International Patent Application No. PCT/JP2020/042053, Jul. 7, 2022.
(Continued)

*Primary Examiner* — William R Alexander
*Assistant Examiner* — Mackenzi Waddell
(74) *Attorney, Agent, or Firm* — Potomac Law Group, PLLC

(57) ABSTRACT

An optical system comprising a first lens group (G1) having a positive refractive power and a rear group (GR) having a plurality of lens groups, the first lens group and the rear group being arranged side by side on the optical axis in order from an object side, wherein: when the magnification is varied from a wide-angle end to a telephoto end, the distance between the first lens group (G1) and the rear group (GR) changes; distances between the plurality of lens groups constituting the rear group (GR) change from each other; the rear group (GR) has a first focusing lens group (GF1) having a negative refractive power and a second focusing lens group (GF2) having a negative refractive power; and both
(Continued)

the first and second focusing lens groups move toward an image side on the optical axis when focusing from infinity to a short distance position.

19 Claims, 20 Drawing Sheets

(51) Int. Cl.
G02B 15/20        (2006.01)
G02B 15/22        (2006.01)

(56)                References Cited

U.S. PATENT DOCUMENTS

| | | | | |
|---|---|---|---|---|
| 2016/0178875 | A1* | 6/2016 | Matsumura | G02B 13/18 |
| | | | | 359/684 |
| 2019/0196157 | A1 | 6/2019 | Kawamura et al. | |
| 2019/0317335 | A1 | 10/2019 | Kawamura | |

| | | | | |
|---|---|---|---|---|
| 2022/0121020 | A1* | 4/2022 | Makida | G02B 13/18 |
| 2022/0357562 | A1* | 11/2022 | Yabumoto | G02B 15/1461 |

FOREIGN PATENT DOCUMENTS

| | | |
|---|---|---|
| JP | 6212279 B2 | 10/2017 |
| JP | 2019-120746 A | 7/2019 |
| JP | 2019-124818 A | 7/2019 |
| JP | 2019-184968 A | 10/2019 |

OTHER PUBLICATIONS

Office Action issued Apr. 25, 2023, in Japanese Patent Application No. 2021-566895.
Office Action issued Mar. 30, 2023, in Chinese Patent Application No. 202080089278.4.
Office Action issued Dec. 27, 2022, in Japanese Patent Application No. 2021-566895.
International Search Report from International Patent Application No. PCT/JP2020/042053, Jan. 26, 2021.

* cited by examiner

SPHERICAL ABERRATION    ASTIGMATISM    DISTORTION

COMA ABERRATION

CHROMATIC ABERRATION OF MAGNIFICATION

SPHERICAL ABERRATION    ASTIGMATISM    DISTORTION

COMA ABERRATION

CHROMATIC ABERRATION OF MAGNIFICATION

FNO=4.62

Y=21.70

Y=21.70

21.70

SPHERICAL
ABERRATION

ASTIGMATISM

DISTORTION 0.500

0.500

5.000%

COMA ABERRATION

CHROMATIC ABERRATION
OF MAGNIFICATION

-0.050

FNO=5.83

Y=21.70

Y=21.70

21.70

SPHERICAL
ABERRATION

ASTIGMATISM

DISTORTION 0.500

0.500

10.00%

COMA ABERRATION

CHROMATIC ABERRATION
OF MAGNIFICATION

-0.050

SPHERICAL ABERRATION     ASTIGMATISM     DISTORTION

CHROMATIC ABERRATION OF MAGNIFICATION

COMA ABERRATION

SPHERICAL ABERRATION     ASTIGMATISM     DISTORTION

CHROMATIC ABERRATION OF MAGNIFICATION

COMA ABERRATION

FNO=4. 61

SPHERICAL
ABERRATION

Y=21. 70

ASTIGMATISM

Y=21. 70

DISTORTION 21. 70

15. 10

10. 80

5. 40

0. 0

COMA ABERRATION

CHROMATIC ABERRATION
OF MAGNIFICATION

FNO=5. 82

SPHERICAL
ABERRATION

Y=21. 70

ASTIGMATISM

Y=21. 70

DISTORTION 21. 70

15. 10

10. 80

5. 40

0. 0

COMA ABERRATION

CHROMATIC ABERRATION
OF MAGNIFICATION

NA=0. 11

Y=21. 70

Y=21. 70

21. 70

15. 10

10. 80

5. 40

0. 0

−0. 100

0. 500

0. 500

5. 000%

SPHERICAL
ABERRATION

ASTIGMATISM

DISTORTION

COMA ABERRATION

−0. 050

CHROMATIC ABERRATION
OF MAGNIFICATION

NA=0. 08

Y=21. 70

Y=21. 70

21. 70

15. 10

10. 80

5. 40

0. 0

−0. 100

0. 500

0. 500

5. 000%

SPHERICAL
ABERRATION

ASTIGMATISM

DISTORTION

COMA ABERRATION

−0. 050

CHROMATIC ABERRATION
OF MAGNIFICATION

SPHERICAL ABERRATION        ASTIGMATISM        DISTORTION

CHROMATIC ABERRATION OF MAGNIFICATION

COMA ABERRATION

SPHERICAL ABERRATION        ASTIGMATISM        DISTORTION

CHROMATIC ABERRATION OF MAGNIFICATION

COMA ABERRATION

SPHERICAL ABERRATION    ASTIGMATISM    DISTORTION

CHROMATIC ABERRATION OF MAGNIFICATION

COMA ABERRATION

SPHERICAL ABERRATION    ASTIGMATISM    DISTORTION

CHROMATIC ABERRATION OF MAGNIFICATION

COMA ABERRATION

SPHERICAL ABERRATION

ASTIGMATISM

DISTORTION

COMA ABERRATION

CHROMATIC ABERRATION OF MAGNIFICATION

SPHERICAL ABERRATION

ASTIGMATISM

DISTORTION

COMA ABERRATION

CHROMATIC ABERRATION OF MAGNIFICATION

SPHERICAL ABERRATION

ASTIGMATISM

DISTORTION

CHROMATIC ABERRATION
OF MAGNIFICATION

COMA ABERRATION

SPHERICAL ABERRATION

ASTIGMATISM

DISTORTION

CHROMATIC ABERRATION
OF MAGNIFICATION

COMA ABERRATION

SPHERICAL ABERRATION    ASTIGMATISM    DISTORTION

CHROMATIC ABERRATION OF MAGNIFICATION

COMA ABERRATION

SPHERICAL ABERRATION    ASTIGMATISM    DISTORTION

CHROMATIC ABERRATION OF MAGNIFICATION

COMA ABERRATION

SPHERICAL ABERRATION

ASTIGMATISM

DISTORTION

COMA ABERRATION

CHROMATIC ABERRATION OF MAGNIFICATION

SPHERICAL ABERRATION

ASTIGMATISM

DISTORTION

COMA ABERRATION

CHROMATIC ABERRATION OF MAGNIFICATION

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus including the same, and a method for manufacturing the zoom optical system.

TECHNICAL BACKGROUND

Optical systems having a configuration of focusing by moving, toward an image, a lens that is disposed close to an image surface and has a negative refractive power (single-focus configuration) have conventionally been known (for example, see Patent literature 1). Such a configuration reduces the weight of the focusing lens group, and allows high-speed focusing. However, use of such a configuration for a zoom optical system (zoom lens) causes a problem in that it is difficult to suppress variation in curvature of field especially in the wide angle end (wide end).

PRIOR ARTS LIST

Patent Document

Patent literature 1: Japanese Reg. Patent Publication No. 6212279(B)

SUMMARY OF THE INVENTION

A zoom optical system according to the present invention consists of, in order from an object on an optical axis: a first lens group having a positive refractive power; and a rear group that includes a plurality of lens groups, wherein upon zooming from a wide angle end to a telephoto end, a distance between the first lens group and the rear group changes, and distances between lens groups constituting the rear group change, the rear group includes, in order from the object: a first focusing lens group having a negative refractive power; and a second focusing lens group having a negative refractive power, both the first focusing lens group and the second focusing lens group move on the optical axis toward an image upon focusing from infinity to a short distance position, and the following conditional expression is satisfied, $$0.000<(MWF1/MTF1)/(MWF2/MTF2)<0.500$$

where

MWF1: an amount of movement of the first focusing lens group upon focusing from infinity to the short distance position in a wide angle end state, MTF1: an amount of movement of the first focusing lens group upon focusing from infinity to the short distance position in a telephoto end state, MWF2: an amount of movement of the second focusing lens group upon focusing from infinity to the short distance position in the wide angle end state, MTF2: an amount of movement of the second focusing lens group upon focusing from infinity to the short distance position in the telephoto end state, and all the amounts of movement toward the image are chosen to be positive.

An optical apparatus according to the present invention is configured to comprise the zoom optical system described above.

A method for manufacturing a zoom optical system according to the present invention consisting of, in order from an object on an optical axis: a first lens group having a positive refractive power; and a rear group that includes a plurality of lens groups, comprises a step of disposing the first lens group and the rear group in a lens barrel in order from an object on an optical axis so that:

upon zooming from a wide angle end to a telephoto end, a distance between the first lens group and the rear group changes, and distances between lens groups constituting the rear group change, the rear group includes, in order from the object: a first focusing lens group having a negative refractive power; and a second focusing lens group having a negative refractive power, both the first focusing lens group and the second focusing lens group move on the optical axis toward an image upon focusing from infinity to a short distance position, and the following conditional expression is satisfied, $$0.000<(MWF1/MTF1)/(MWF2/MTF2)<0.500$$

MWF1: an amount of movement of the first focusing lens group upon focusing from infinity to the short distance position in a wide angle end state, MTF1: an amount of movement of the first focusing lens group upon focusing from infinity to the short distance position in a telephoto end state, MWF2: an amount of movement of the second focusing lens group upon focusing from infinity to the short distance position in the wide angle end state, MTF2: an amount of movement of the second focusing lens group upon focusing from infinity to the short distance position in the telephoto end state, and all the amounts of movement toward the image are defined to be positive.

3

Figure 8A:
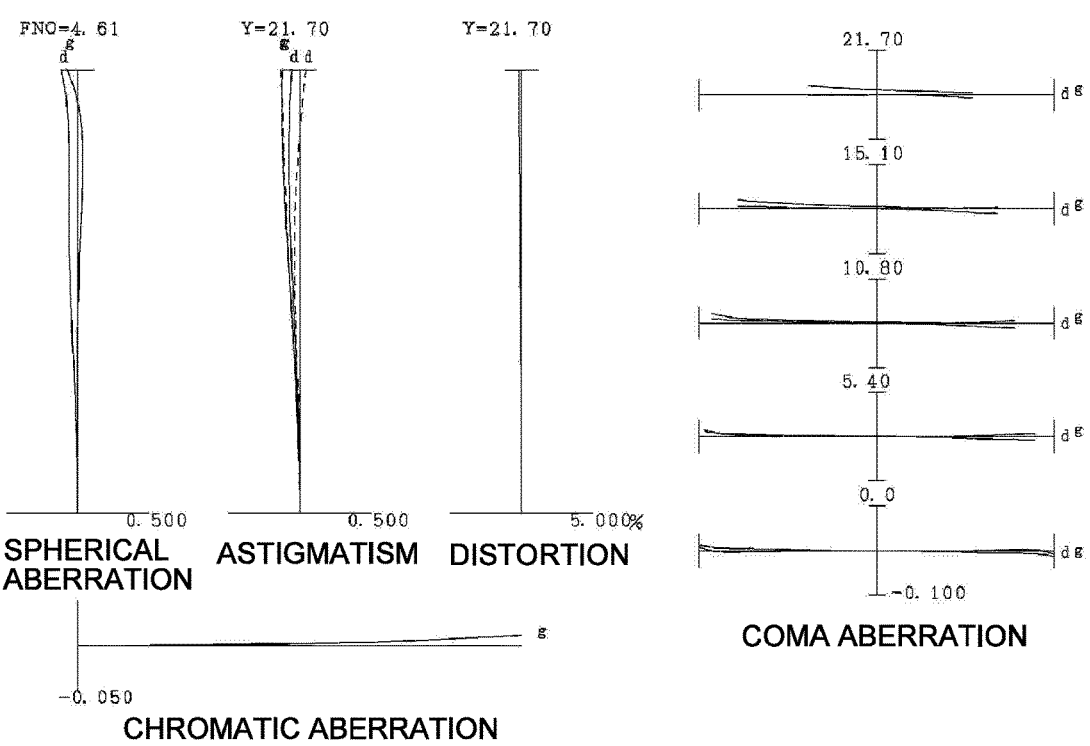
Figure 8B:
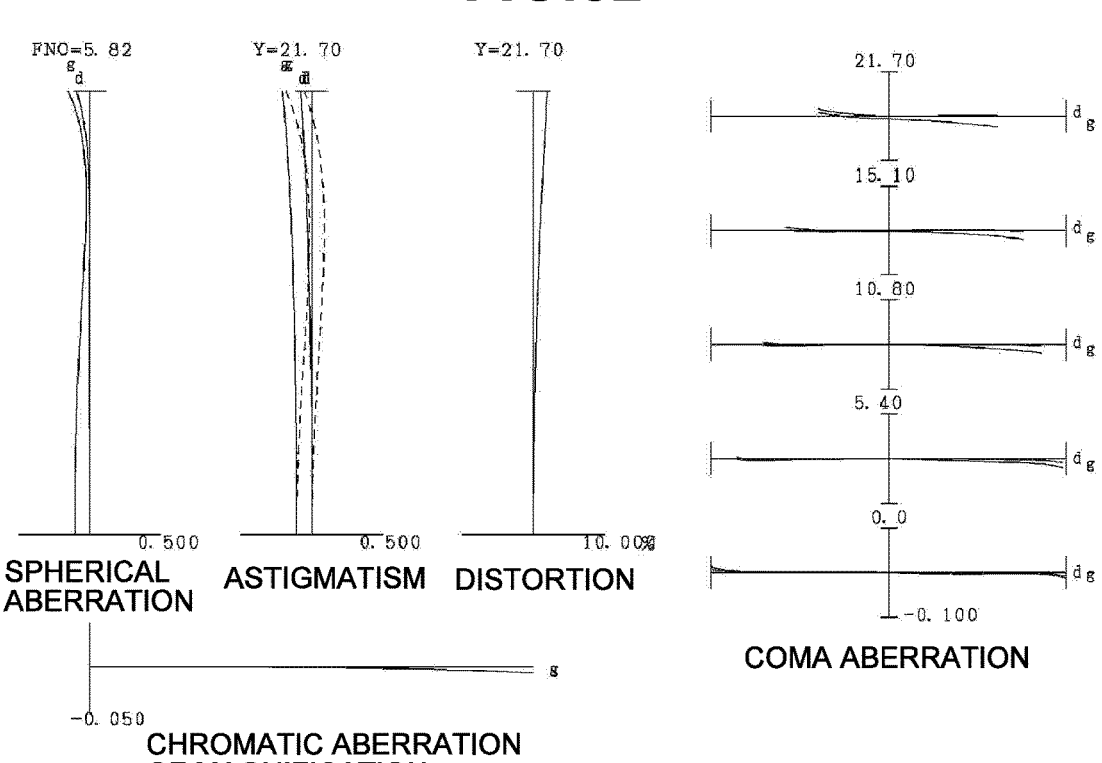
Figure 9A:
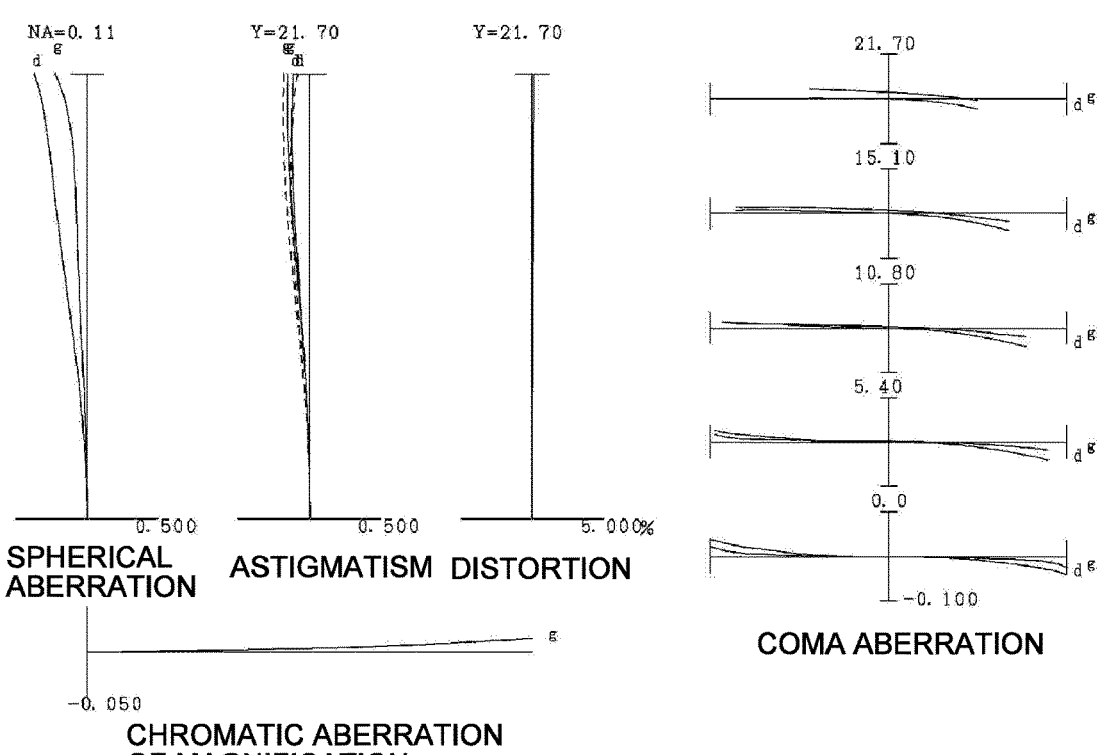
Figure 9B:
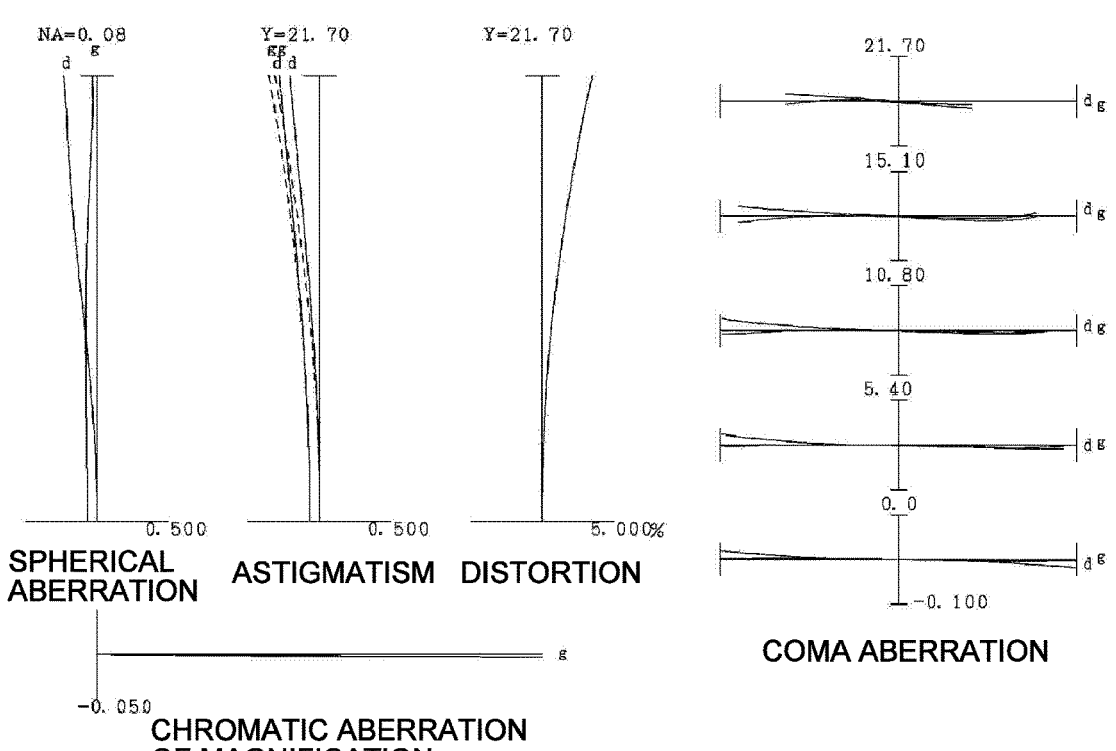
Figure 10:
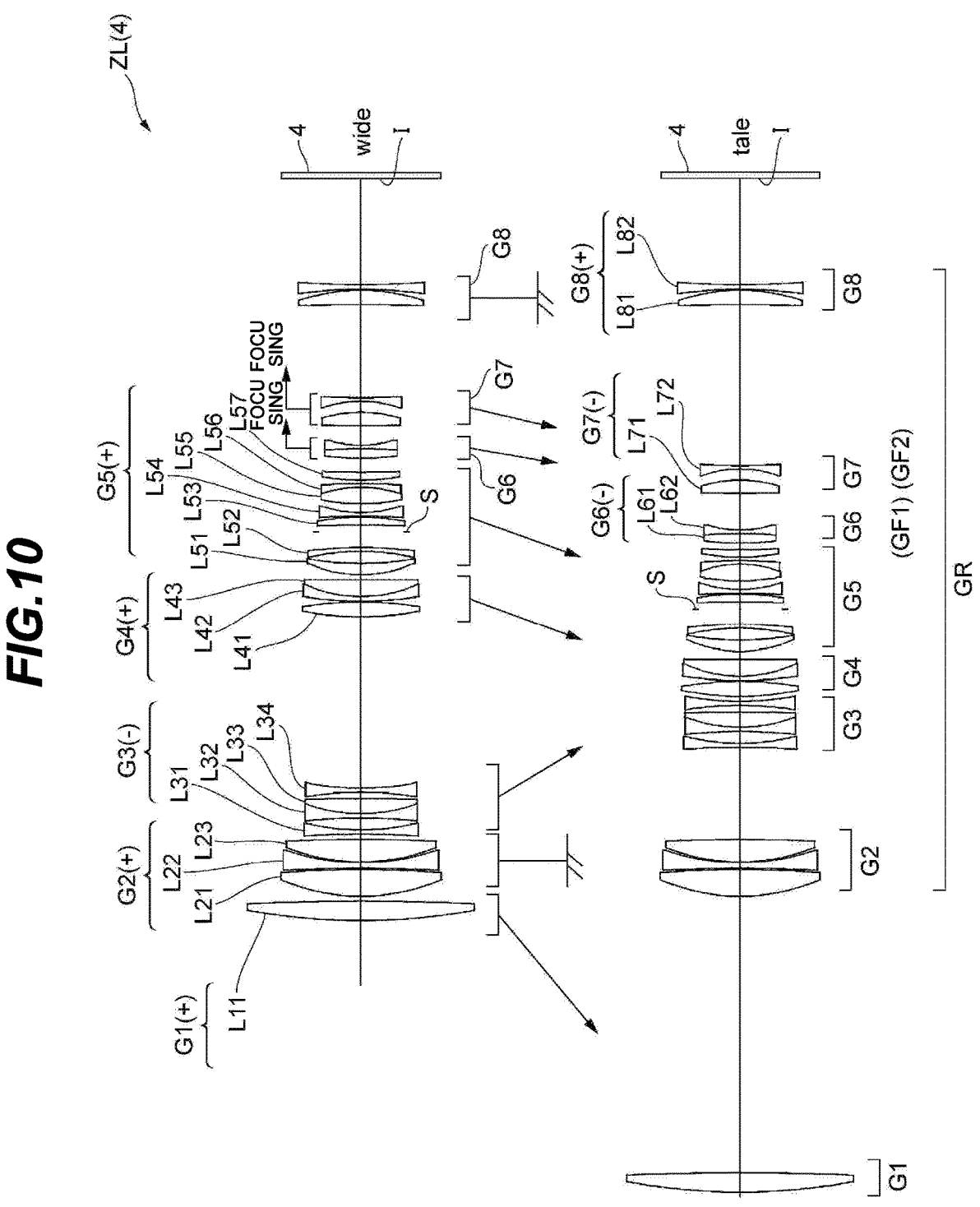
Figure 11A:
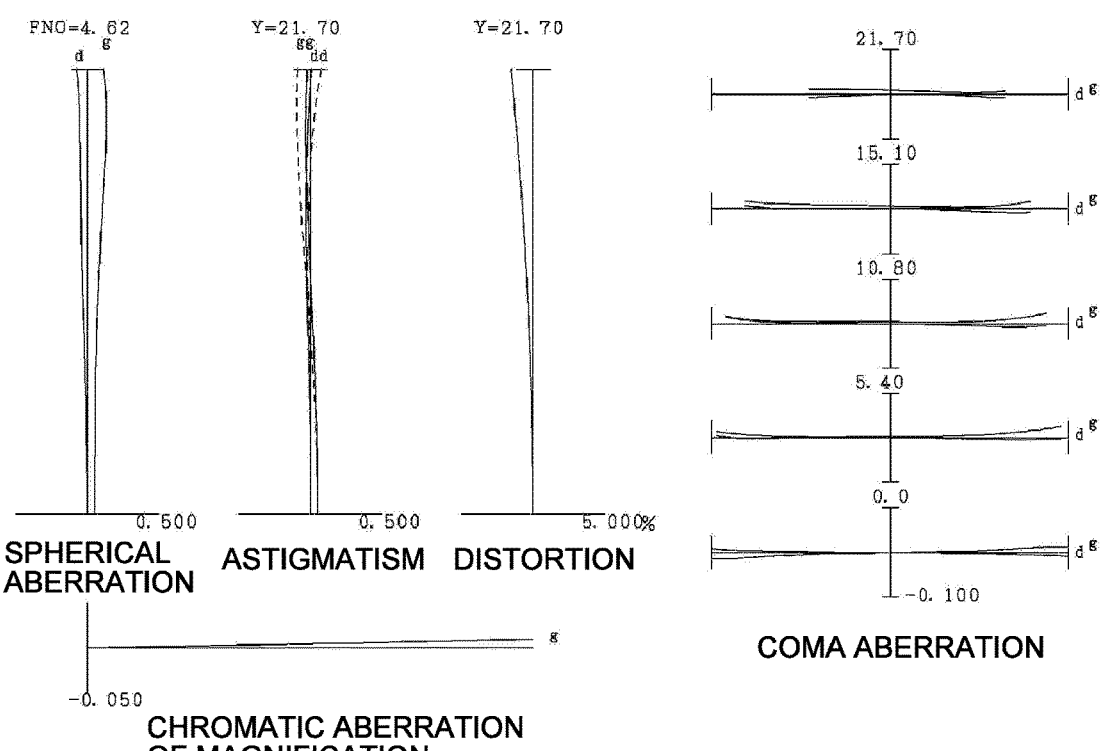
Figure 11B:
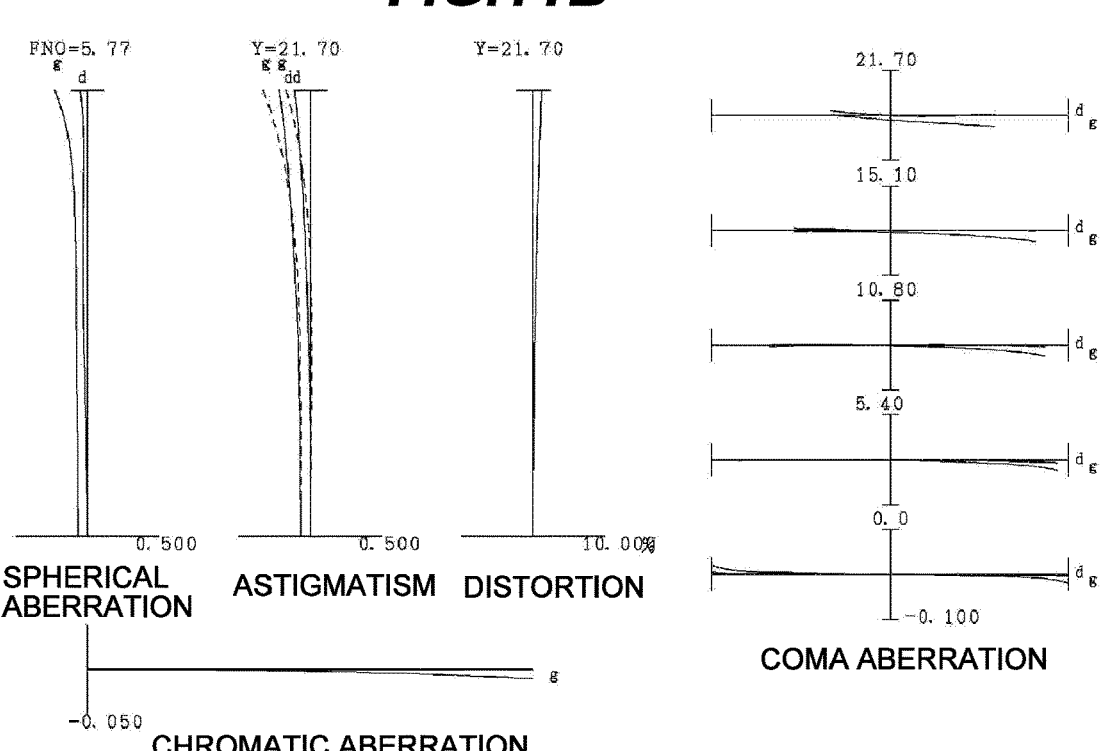
Figure 12A:
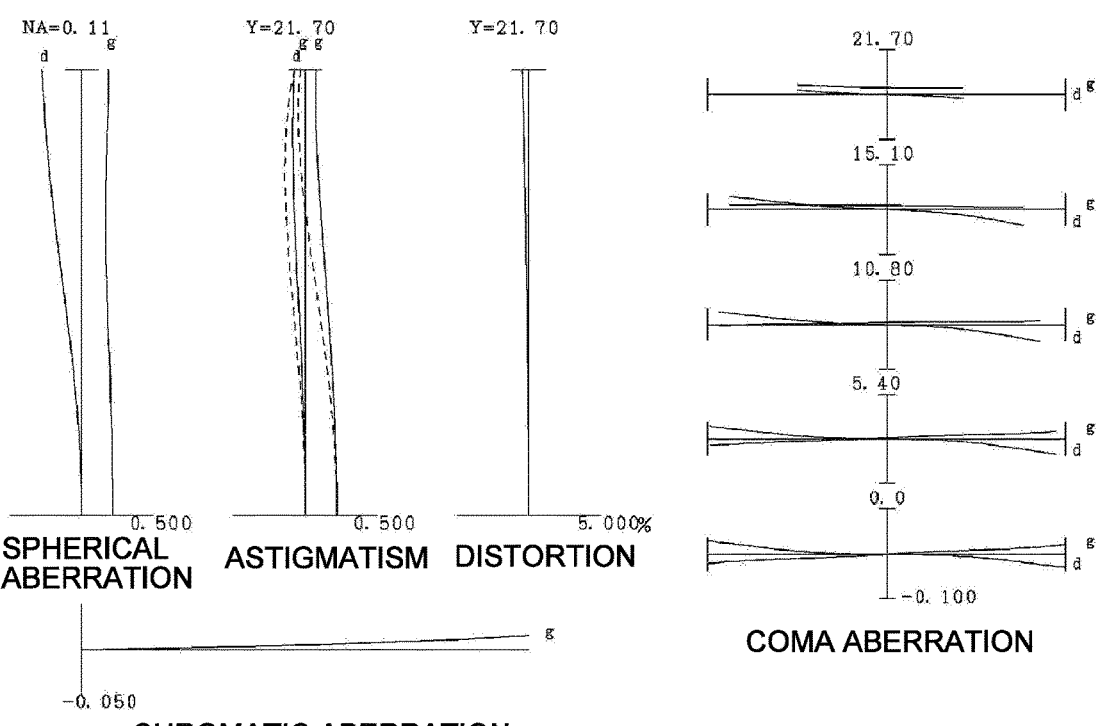
Figure 12B:
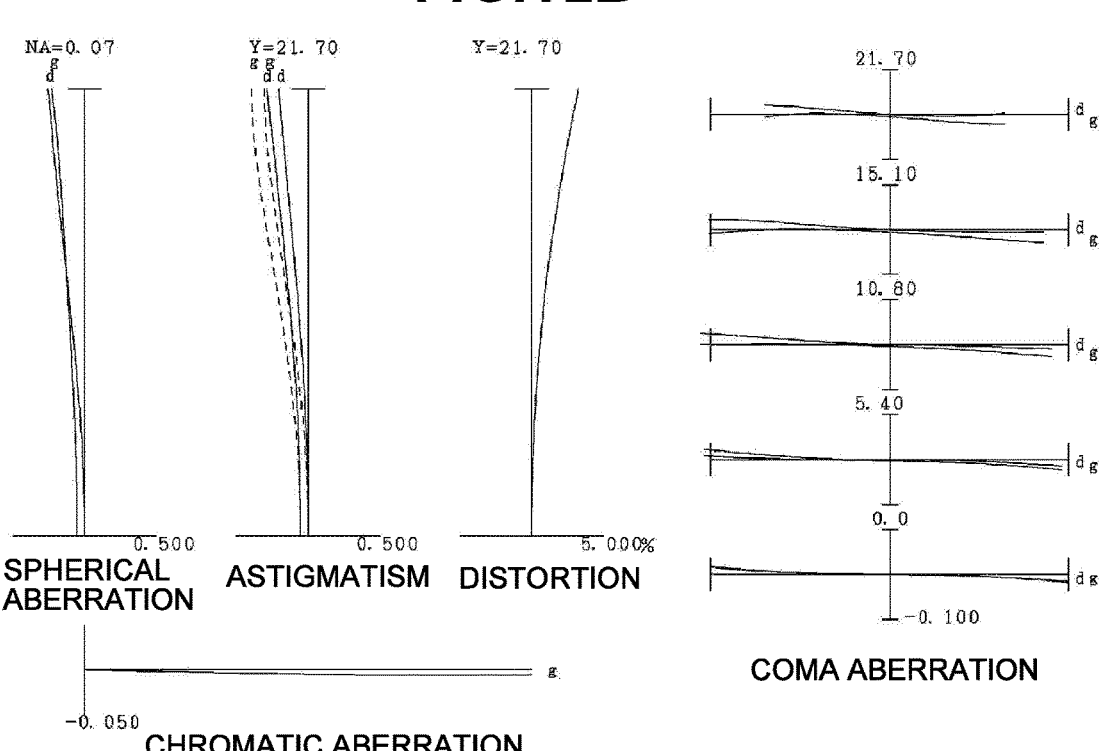
Figure 13:
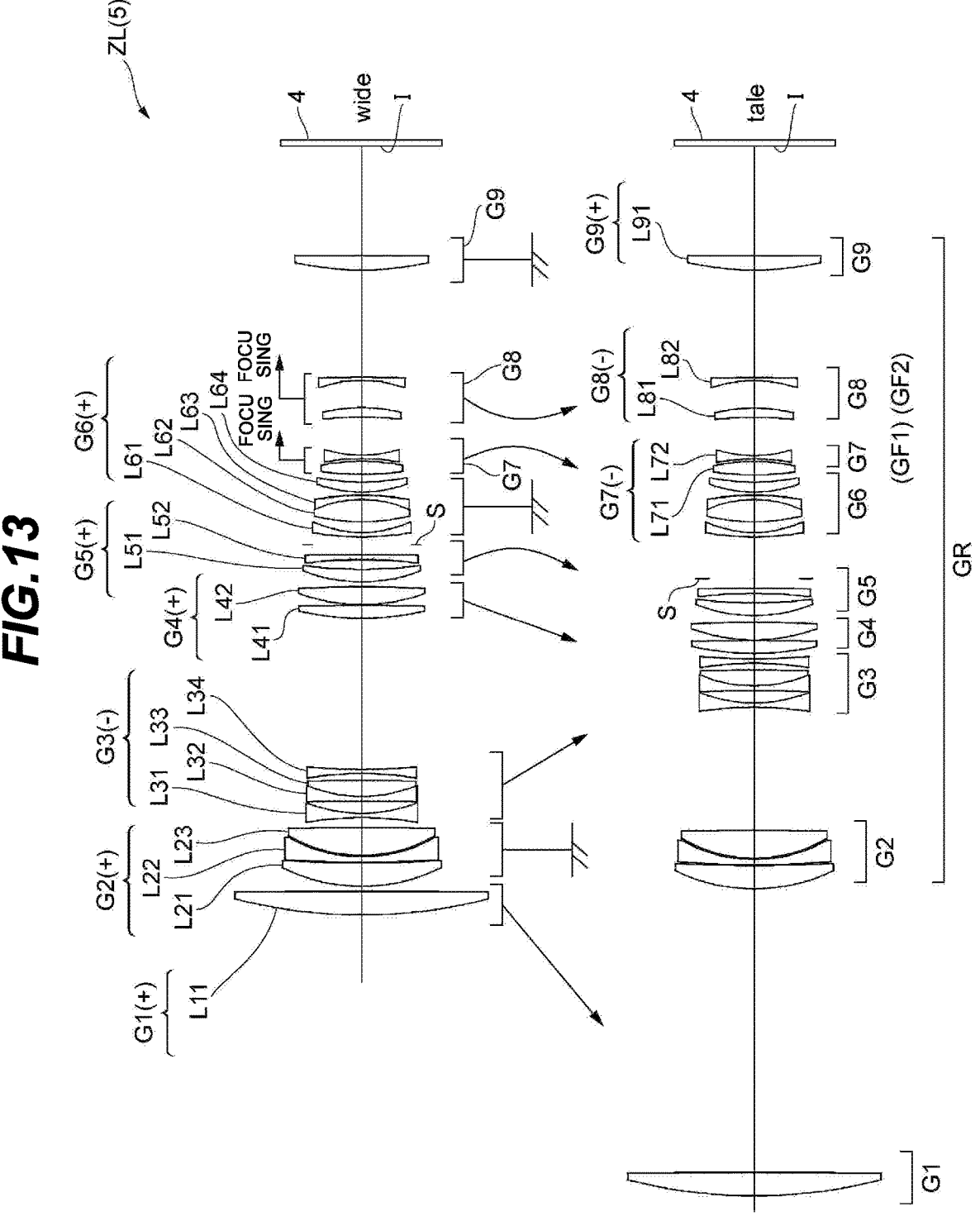
Figure 14A:
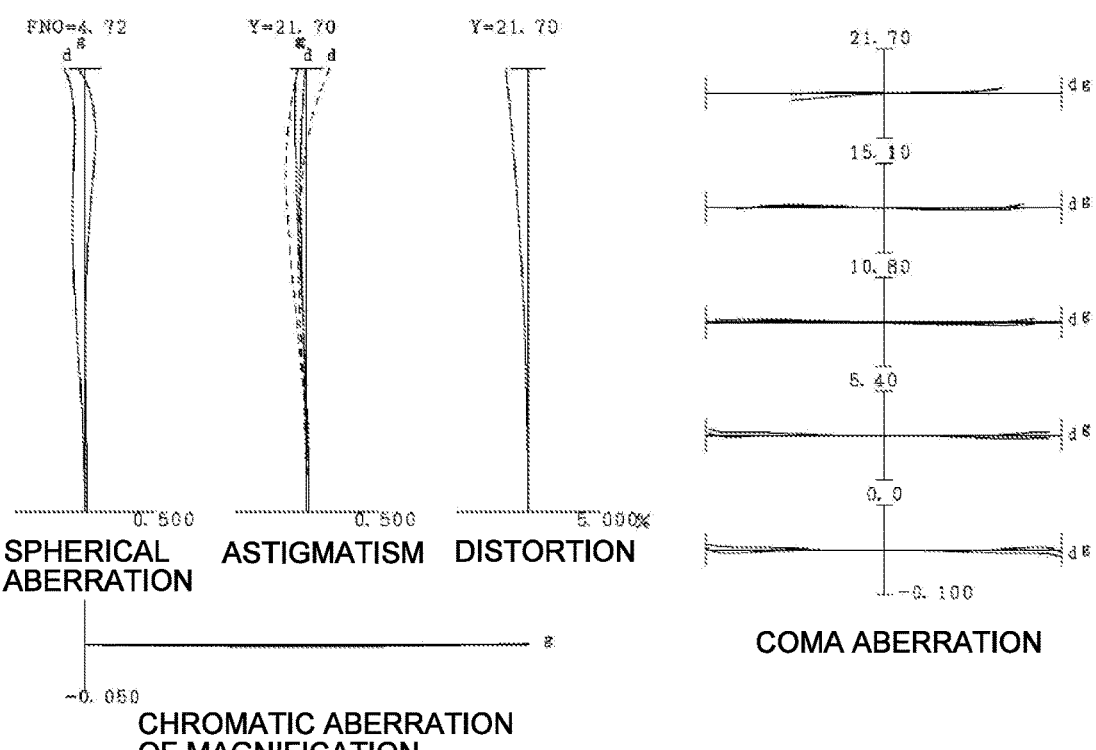
Figure 14B:
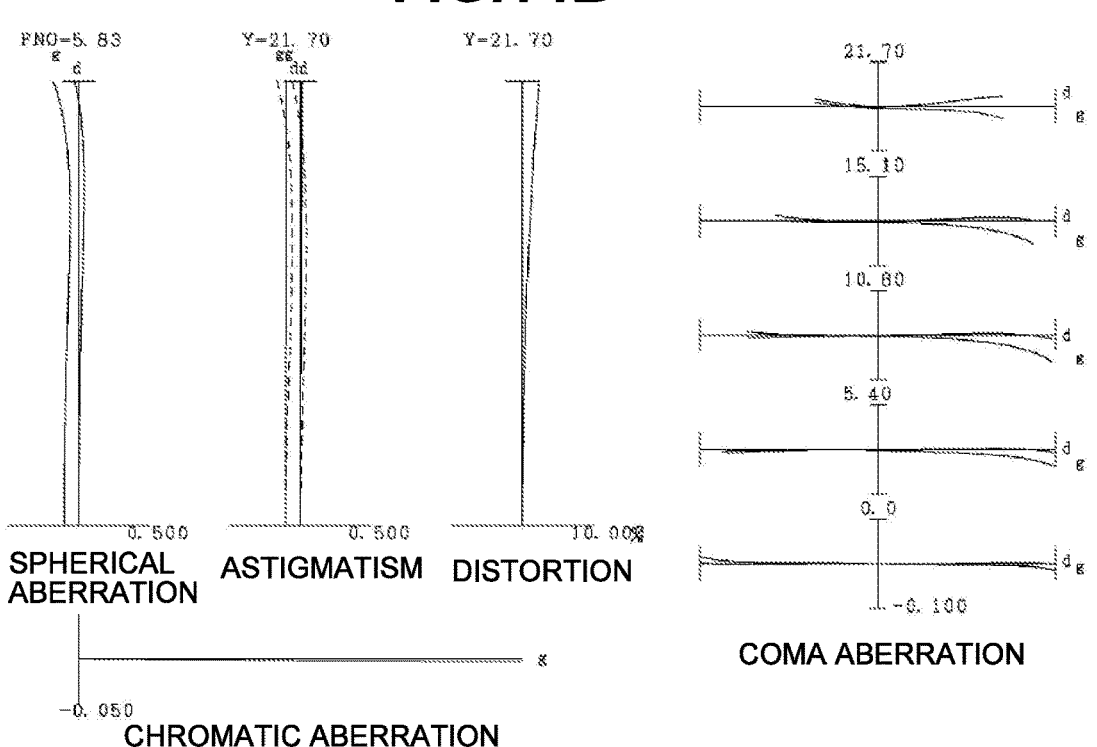
Figure 15A:
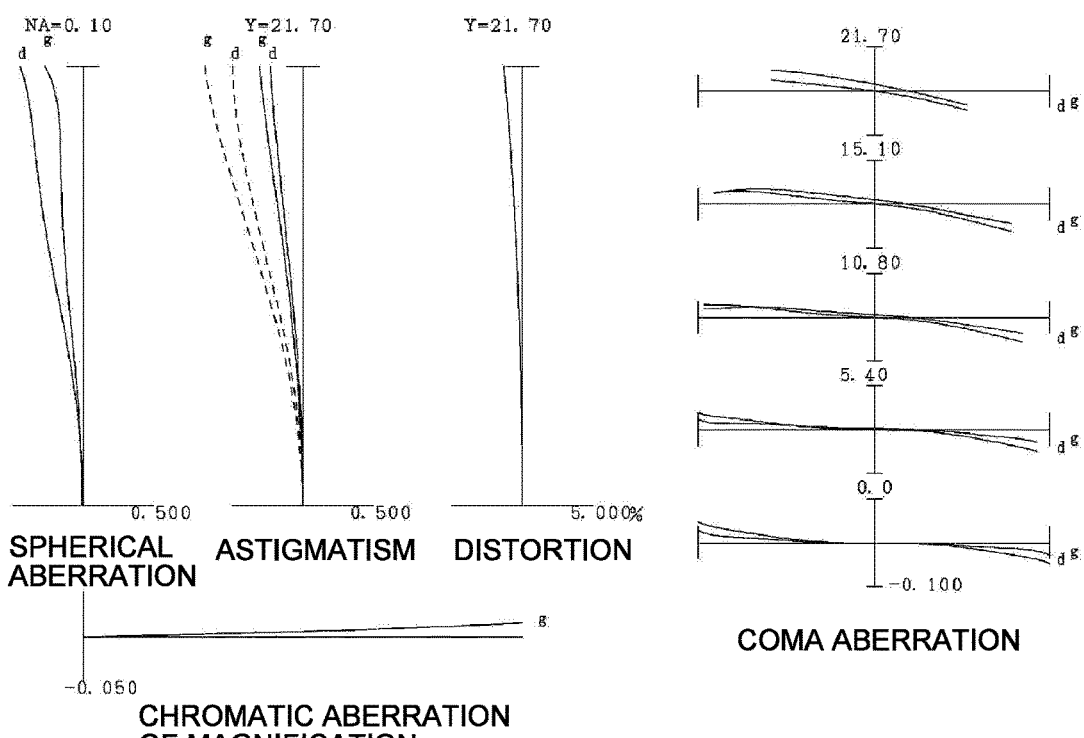
Figure 15B:
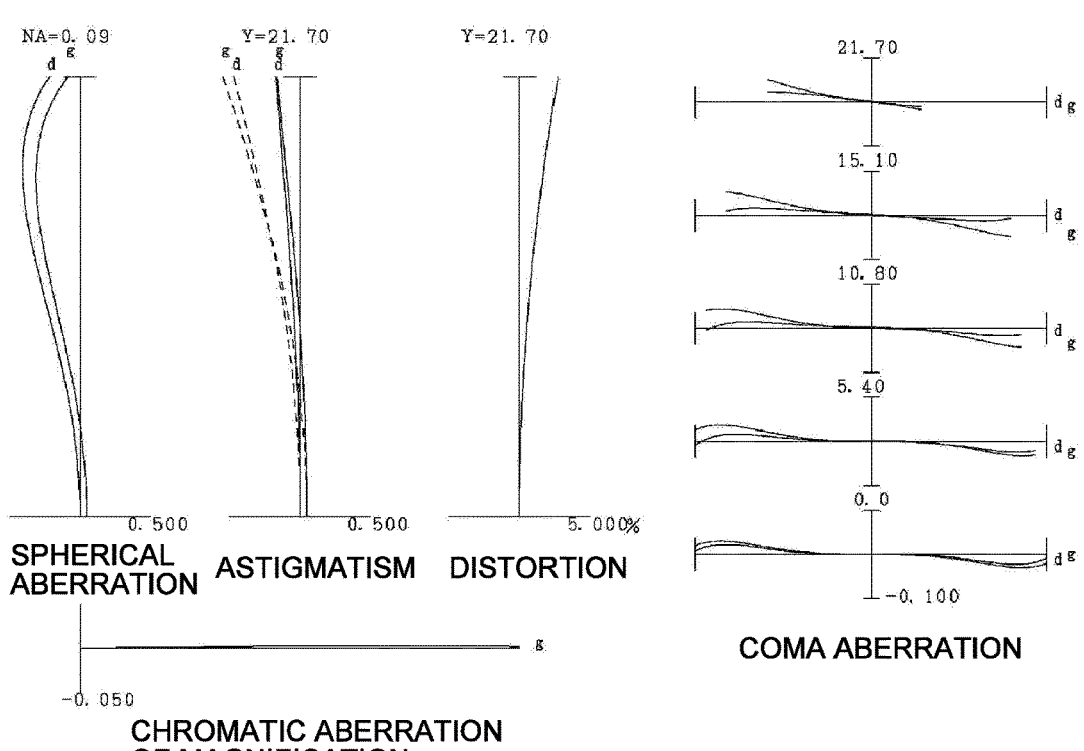
Figure 16:
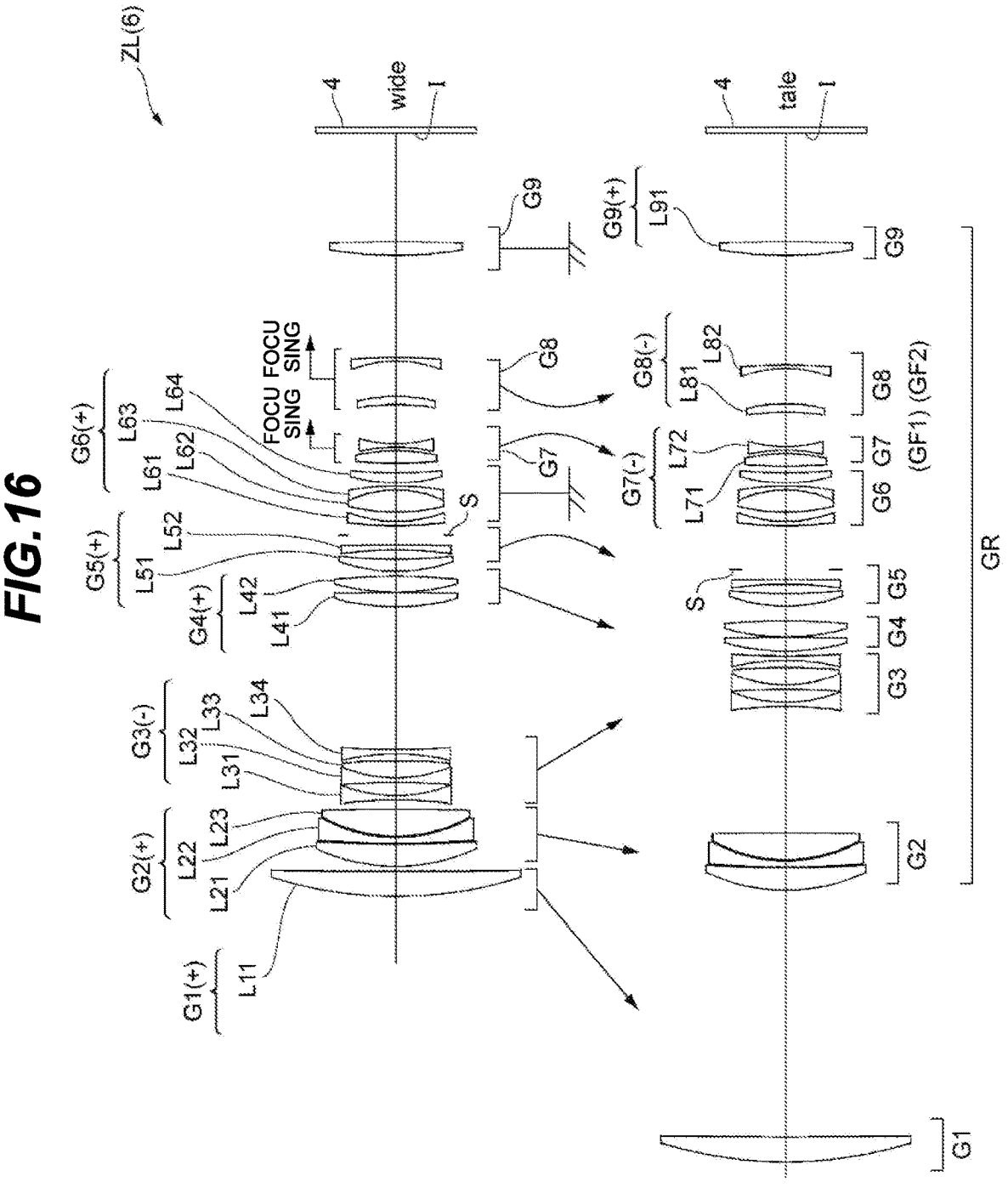
Figure 17A:
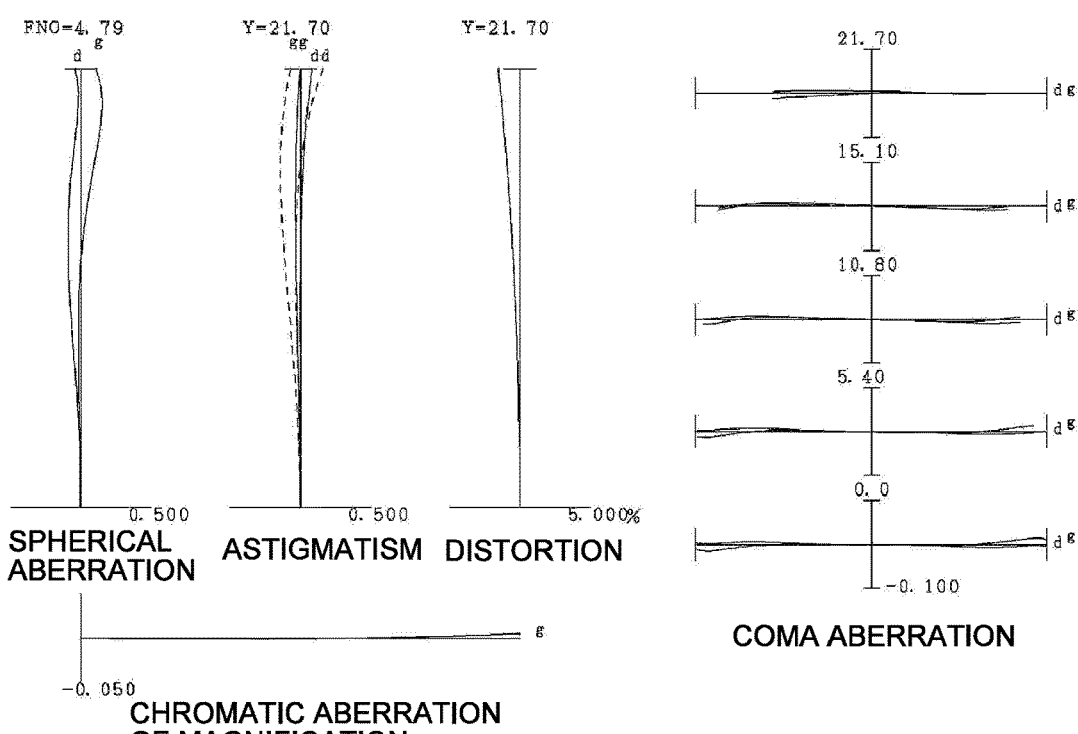
Figure 17B:
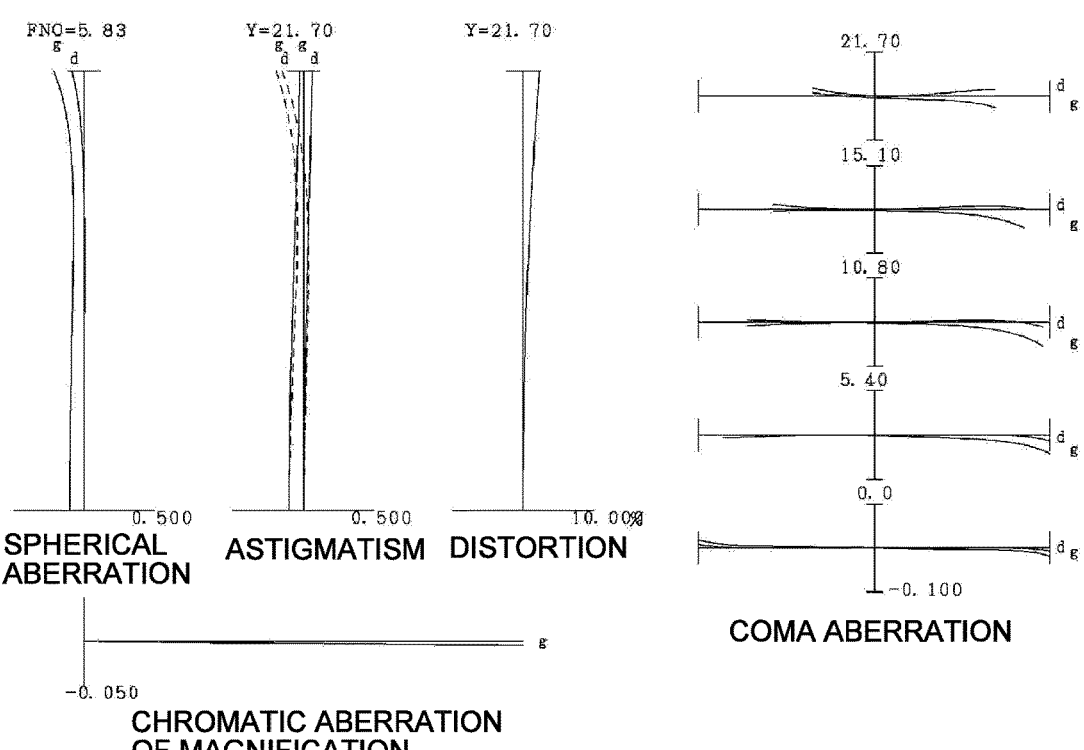
Figure 18A:
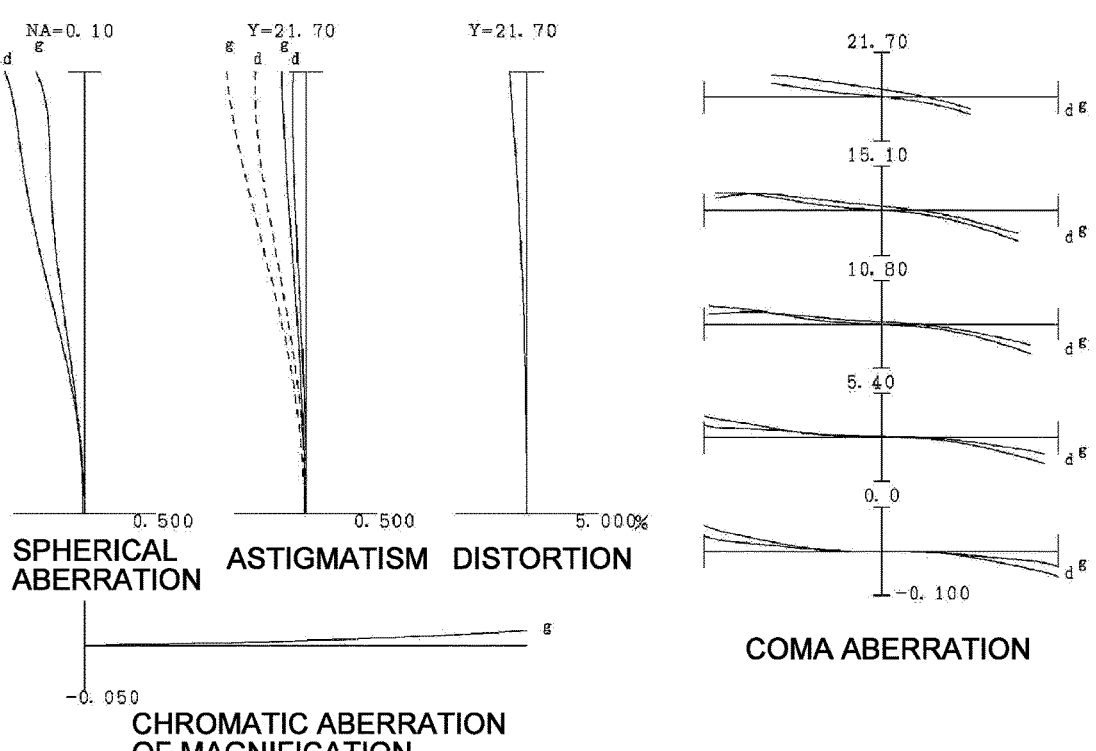
Figure 18B:
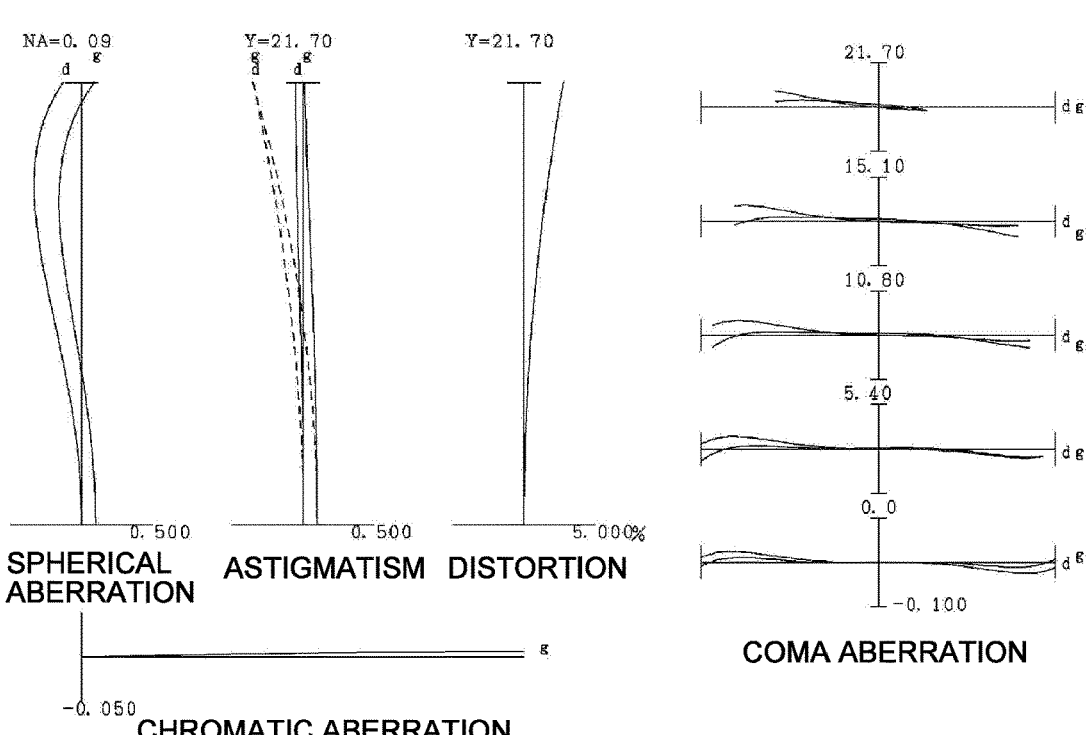
Figure 19:
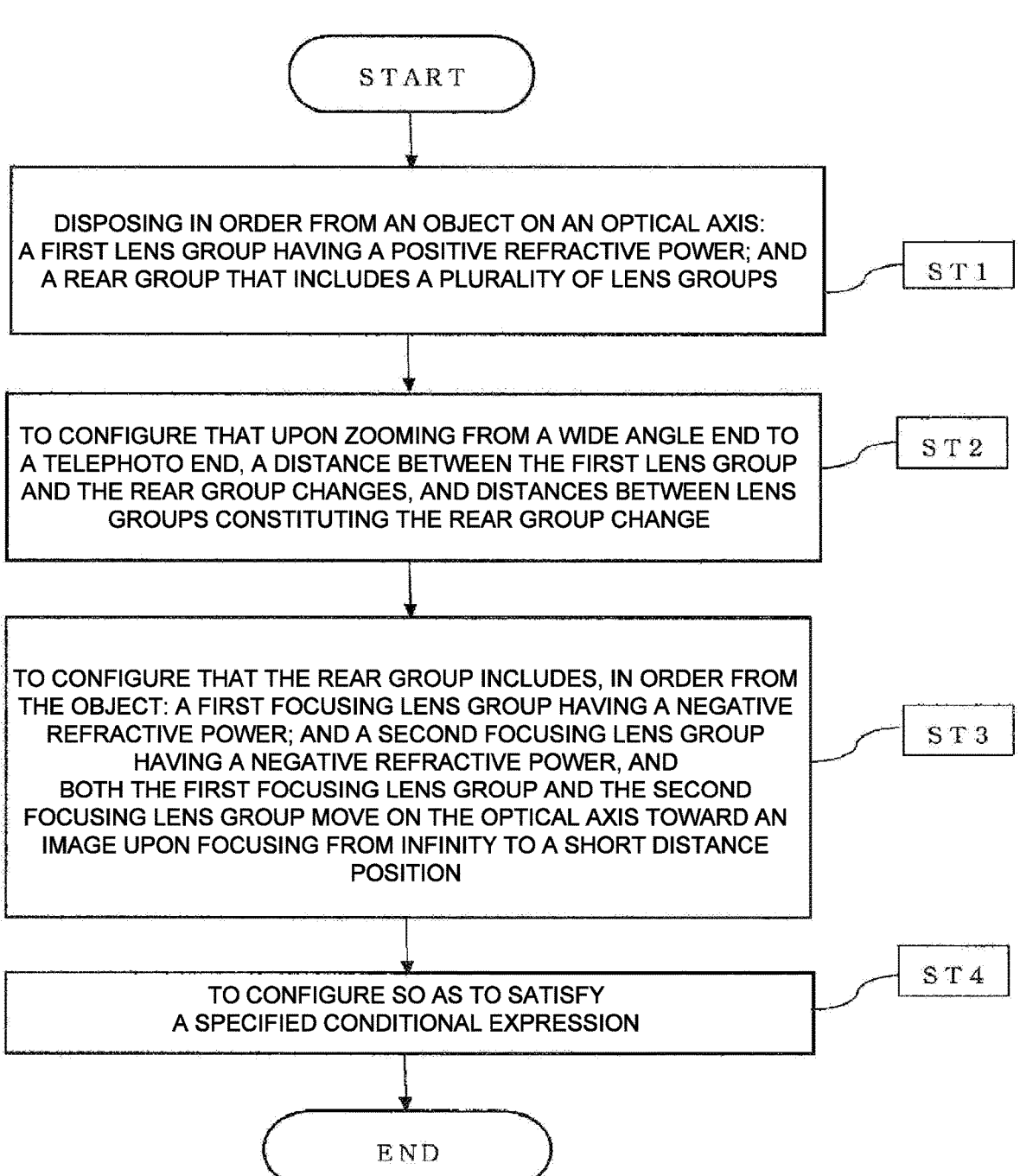
Figure 20:
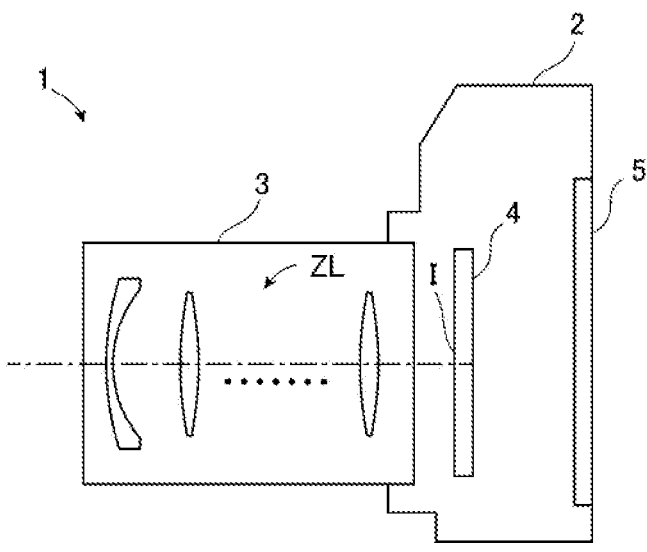

FIGS. 8A and 8B are graphs respectively showing various aberrations of the zoom optical system according to the third example upon focusing on infinity in a wide angle end state and a telephoto end state;

FIGS. 9A and 9B are graphs respectively showing various aberrations of the zoom optical system according to the third example upon short-distance focusing in the wide angle end state and the telephoto end state;

FIG. 10 shows a lens configuration of a zoom optical system according to a fourth example;

FIGS. 11A and 11B are graphs respectively showing various aberrations of the zoom optical system according to the fourth example upon focusing on infinity in a wide angle end state and a telephoto end state;

FIGS. 12A and 12B are graphs respectively showing various aberrations of the zoom optical system according to the fourth example upon short-distance focusing in the wide angle end state and the telephoto end state;

FIG. 13 shows a lens configuration of a zoom optical system according to a fifth example;

FIGS. 14A and 14B are graphs respectively showing various aberrations of the zoom optical system according to the fifth example upon focusing on infinity in a wide angle end state and a telephoto end state;

FIGS. 15A and 15B are graphs respectively showing various aberrations of the zoom optical system according to the fifth example upon short-distance focusing in the wide angle end state and the telephoto end state;

FIG. 16 shows a lens configuration of a zoom optical system according to a sixth example;

FIGS. 17A and 17B are graphs respectively showing various aberrations of the zoom optical system according to the sixth example upon focusing on infinity in a wide angle end state and a telephoto end state;

FIGS. 18A and 18B are graphs respectively showing various aberrations of the zoom optical system according to the sixth example upon short-distance focusing in the wide angle end state and the telephoto end state;

FIG. 19 is a flowchart showing a method for manufacturing the zoom optical system according to this embodiment; and FIG. 20 shows a configuration of a camera that includes the zoom optical system according to this embodiment.

DESCRIPTION OF THE EMBODIMENTS

Hereinafter, preferable embodiments according to the present invention are described. First, a camera (optical apparatus) that includes a zoom optical system according to each embodiment is described with reference to FIG. 20. As shown in FIG. 20, this camera 1 includes a main body 2, and a photographing lens 3 attached to the main body 2. The main body 2 includes an imaging element 4, a main body control part (not shown) that controls the operation of the digital camera, and a liquid crystal operation screen 5. The photographing lens 3 includes an optical system ZL that includes a plurality of lens groups, and a lens position control mechanism (not shown) that controls the position of each lens group. The lens position control mechanism includes a sensor that detects the position of each lens group, a motor that moves each lens group forward and backward on the optical axis, and a control circuit that drives the motor.

Light from a photographic subject is condensed by the optical system ZL of the photographing lens 3, and reaches an image surface I of the imaging element 4. The light having reached the image surface I from the photographic subject is photoelectrically converted by the imaging element 4, and is recorded as digital image data in a memory, not shown. The digital image data recorded in the memory is allowed to be displayed on the liquid crystal screen 5 according to an operation by a user. Note that this camera may be a mirrorless camera, or a single-lens reflex camera that includes a quick return mirror.

Figure 1:
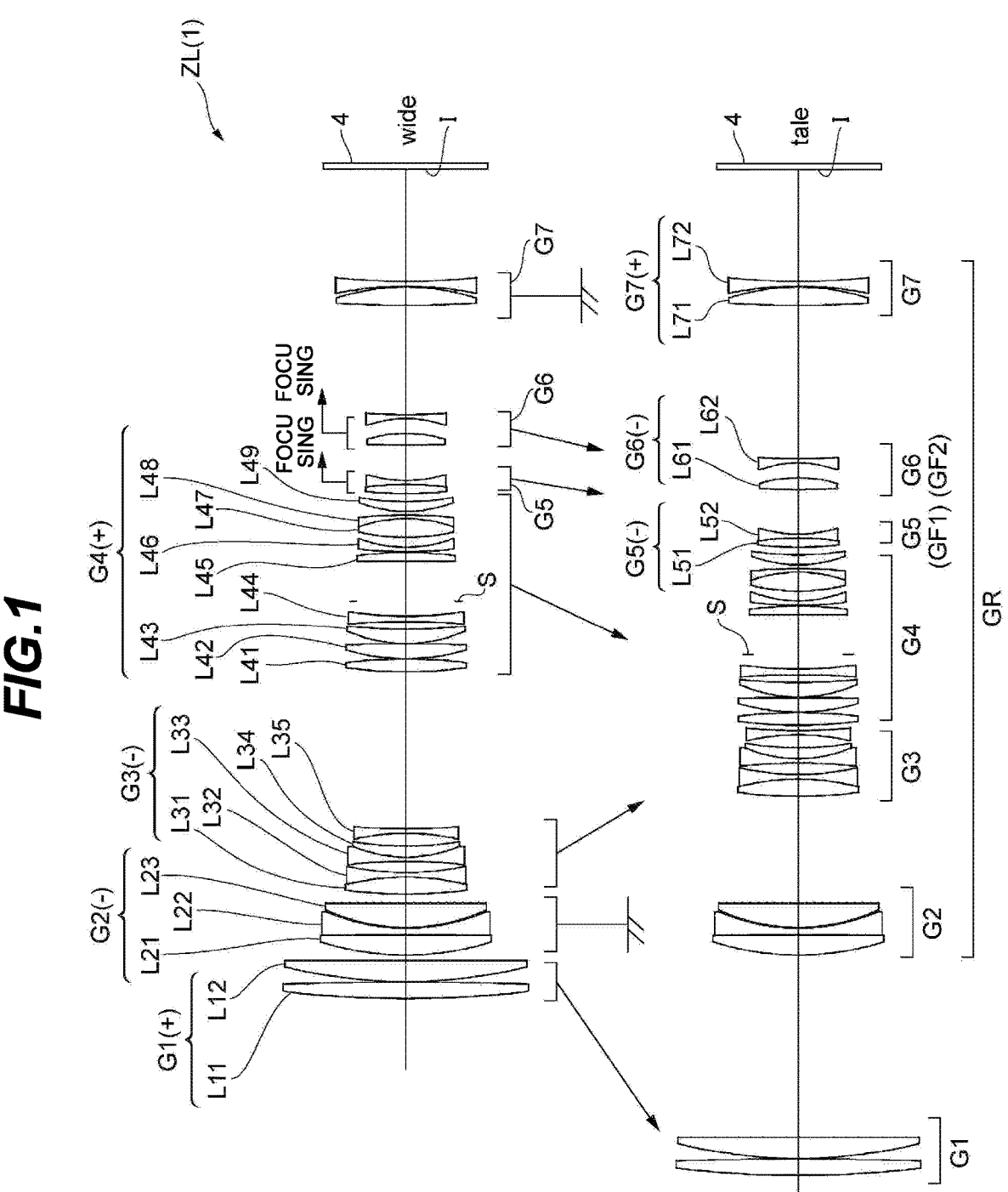
FIG. 1 shows a lens configuration of a zoom optical system according to a first example.

Next, the zoom optical system (photographing lens 3) according to this embodiment is described. As shown in FIG. 1, a zoom optical system ZL(1) that is an example of the zoom optical system (zoom lens) ZL according to this embodiment consists of, in order from an object on an optical axis: a first lens group G1 having a positive refractive power; and a rear group GR that includes a plurality of lens groups, wherein upon zooming from a wide angle end to a telephoto end, a distance between the first lens group G1 and the rear group GR changes, and distances between lens groups constituting the rear group GR change, the rear group GR includes, in order from the object: a first focusing lens group GF1 having a negative refractive power; and a second focusing lens group GF2 having a negative refractive power, and both the first focusing lens group GF1 and the second focusing lens group GF2 move on the optical axis toward an image upon focusing from infinity to a short distance position.

Furthermore, the zoom optical system ZL satisfies the following conditional expression (1):

$$0.000 < (MWF1/MTF1)/(MWF2/MTF2) < 0.500 \tag{1}$$

where

MWF1: an amount of movement of the first focusing lens group upon focusing from infinity to the short distance position in a wide angle end state, MTF1: an amount of movement of the first focusing lens group upon focusing from infinity to the short distance position in a telephoto end state, MWF2: an amount of movement of the second focusing lens group upon focusing from infinity to the short distance position in the wide angle end state, MTF2: an amount of movement of the second focusing lens group upon focusing from infinity to the short distance position in the telephoto end state, and all the amounts of movement toward the image are chosen to be positive.

As the zoom optical system has the configuration including two focusing lens groups that are the first and second focusing lens groups GF1 and GF2 as described above, the amount of movement of each focusing lens group is allowed to be different between in the wide angle end state and in the telephoto end state. Accordingly, the variation in curvature of field prone to cause a problem in the wide angle end state can be favorably corrected. The variation in spherical aberration prone to cause a problem in the telephoto end state can be favorably corrected. The optical system with the aberrations being favorably corrected over the entire zooming region can be achieved.

In particular, by satisfying the conditional expression (1) described above, during change from a state of focusing on a long distance object (infinity object) to a state of focusing on a short distance object in the wide angle end state, the amount of movement of the first focusing lens group GF1 is smaller than the amount of movement of the second focusing lens group GF2. During change from the state of focusing on the long distance object (infinity object) to the state of focusing on the short distance object in the telephoto end state, the amount of movement of the first focusing lens group GF1 is slightly larger than or equivalent to the amount of movement of the second focusing lens group GF2. The optical system with aberrations being favorably corrected over the entire zooming region can be achieved. To further secure the advantageous effects of this embodiment, it is preferable to set the upper limit value of the conditional expression (1) to 0.450, 0.400, 0.350, 0.300, 0.280, 0.250, 0.230, 0.200, 0.180, 0.150, or further to 0.125, for example. It is preferable to set the lower limit value of the conditional expression (1) to 0.002, 0.004, 0.005, 0.006, 0.008, 0.009, or further to 0.010, for example.

Preferably, in the zoom optical system described above, the following conditional expression (2) is satisfied, $$0.00 < MWF1/MWF2 < 0.50. \tag{2}$$

The conditional expression (2) defines the ratio between the amount of movement MWF1 of the first focusing lens group and the amount of movement MWF2 of the second focusing lens group upon focusing from infinity to the short distance position in the wide angle end state. By satisfying the expression, the difference between the amounts of movement of the two focusing lens groups upon focusing in the wide angle end state is allowed to be large, which can achieve favorable aberration correction over the entire region. If the upper limit value of the conditional expression (2) is exceeded, the difference between the amounts of movement of the focusing lens groups becomes too small, which causes a problem of increasing the variation in curvature of field upon short-distance focusing. On the other hand, if the lower limit value of the conditional expression (3) is not reached, the ratio becomes negative, which means deviation from the original intention. To further secure the advantageous effects of this embodiment, it is preferable to set the upper limit value of the conditional expression (2) to 0.45, 0.40, 0.30, 0.28, 0.25, 0.23, 0.20, 0.18, or further to 0.15, for example. It is preferable to set the lower limit value of the conditional expression (2) to 0.004, 0.005, 0.006, 0.008, 0.010, or further to 0.012, for example.

Preferably, in the zoom optical system described above, the following conditional expression (3) is satisfied, $$0.50 < MTF1/MTF2 < 1.50. \tag{3}$$

The conditional expression (3) defines the ratio between the amount of movement MTF1 of the first focusing lens group and the amount of movement MTF2 of the second focusing lens group upon focusing from infinity to the short distance position in the telephoto end state. By satisfying the expression, the difference between the amounts of movement of the two focusing lens groups upon focusing in the telephoto end state is allowed to be equivalent, which can achieve favorable aberration correction over the entire region. If the upper limit value of the conditional expression (3) is exceeded, the movement of the first focusing lens group becomes too large, which causes a problem of increasing the variation in curvature of field. On the other hand, if the lower limit value of the conditional expression (3) is not reached, a problem occurs in that the variation in spherical aberration upon short-distance focusing becomes large. To further secure the advantageous effects of this embodiment, it is preferable to set the upper limit value of the conditional expression (3) to 1.45, 1.40, 1.35, 1.30, 1.28, 1.25, 1.23, 1.20, 1.18, or 1.15, for example. It is preferable to set the lower limit value of the conditional expression (3) to 0.55, 0.60, 0.65, 0.70, 0.75, 0.80, 0.85, or further to 0.90, for example.

Preferably, in the zoom optical system described above, the following conditional expression (4) is satisfied, $$0.30 < fF1/fF2 < 1.50 \tag{4}$$

where
fF1: a focal length of the first focusing lens group, and
fF2: a focal length of the second focusing lens group.

The conditional expression (4) defines the ratio between the focal lengths of the first focusing lens group and the second focusing lens group. By satisfying the expression, a high focusing accuracy, and favorable aberration correction upon short-distance focusing can be compatibly achieved. If the upper limit value of the conditional expression (4) is exceeded, the refractive power of the second focusing lens group becomes too strong, which causes a problem of increasing the image surface sensitivity and reducing the focusing accuracy. On the other hand, if the lower limit value of the conditional expression (4) is not reached, the refractive power of the first focusing lens group becomes too strong, which makes it difficult to achieve favorable aberration correction upon short-distance focusing. To further secure the advantageous effects of this embodiment, it is preferable to set the upper limit value of the conditional expression (4) to 1.45, 1.40, 1.35, 1.30, 1.25, 1.20, 1.15, 1.10, 1.05, or further to 1.00, for example. It is preferable to set the lower limit value of the conditional expression (4) to 0.35, 0.38, 0.40, 0.43, 0.45, 0.48, 0.50, 0.53, or further to 0.55, for example.

Preferably, in the zoom optical system described above, the following conditional expression (5) is satisfied, $$0.20 < fF1p/(-fF1) < 2.00 \tag{5}$$

where
fF1p: a focal length of a lens that is included in the first focusing lens group and has a positive refractive power, and
fF1: a focal length of the first focusing lens group.

The conditional expression (5) defines the ratio between the focal length of the lens that is included in the first focusing lens group and has a positive refractive power and the focal length of the first focusing lens group. By satisfying the expression, the lens that is included in the first focusing lens group and has a positive refractive power can favorably suppress the variation in various aberrations upon short-distance focusing. If the upper limit value of the conditional expression (5) is exceeded, the refractive power of the lens having a positive refractive power becomes weak, which makes it difficult to suppress the variation in chromatic aberrations. On the other hand, if the lower limit value of the conditional expression (5) is not reached, the refractive power of the lens having a positive refractive power becomes strong, which makes it difficult to suppress the variation in curvature of field. To further secure the advantageous effects of this embodiment, it is preferable to set the upper limit value of the conditional expression (5) to 1.75, 1.50, 1.40, 1.30, 1.20, 1.10, 1.00, 0.95, 0.90, or further to 0.85, for example. It is preferable to set the lower limit value of the conditional expression (5) to 0.25, 0.30, 0.35, 0.40, 0.45, 0.50, 0.52, 0.55, 0.58, or further to 0.60, for example.

Preferably, in the zoom optical system described above, the following conditional expression (6) is satisfied, $$0.20 < fF2p/(-fF2) < 2.00 \tag{6}$$

where
fF2p: a focal length of a lens that is included in the second focusing lens group and has a positive refractive power, and
fF2: a focal length of the second focusing lens group.

The conditional expression (6) defines the ratio between the focal length of the lens that is included in the second focusing lens group and has a positive refractive power and the focal length of the second focusing lens group. By satisfying the expression, the lens that is included in the second focusing lens group and has a positive refractive power can favorably suppress the variation in various aberrations upon short-distance focusing. If the upper limit value of the conditional expression (6) is exceeded, the refractive power of the lens having a positive refractive power becomes weak, which makes it difficult to suppress the variation in chromatic aberrations. On the other hand, if the lower limit value of the conditional expression (6) is not reached, the refractive power of the lens having a positive refractive power becomes strong, which makes it difficult to suppress the variation in spherical aberration. To further secure the advantageous effects of this embodiment, it is preferable to set the upper limit value of the conditional expression (6) to 1.95, 1.90, 1.85, 1.80, 1.78, 1.70, 1.60, 1.50, 1.45, 1.30, 1.20, 1.10, 1.00, 0.90, or further to 0.80, for example. It is preferable to set the lower limit value of the conditional expression (6) to 0.24, 0.27, 0.30, 0.33, 0.35, 0.38, 0.40, or further to 0.42, for example.

Preferably, in the zoom optical system described above, the following conditional expression (7) is satisfied, $$0.20 < (-fF2)/fR < 1.00 \tag{7}$$

where fR: a combined focal length of lens groups positioned closer to the image than the second focusing lens group, and fF2: a focal length of the second focusing lens group.

The conditional expression (7) defines the ratio between the combined focal length of the lens groups positioned closer to the image than the second focusing lens group and the focal length of the second focusing lens group. By satisfying the expression, the lens group having a positive refractive power is disposed on the image side of the second focusing lens group. Accordingly, the variation in various aberrations upon short-distance focusing can be favorably suppressed. If the upper limit value of the conditional expression (7) is exceeded, the positive refractive power of the lens group positioned closer to the image than the second focusing lens group becomes weak, which makes it difficult to suppress the variation in curvature of field. On the other hand, if the lower limit value of the conditional expression (7) is not reached, the positive refractive power of the lens group positioned closer to the image than the second focusing lens group becomes strong, which makes it difficult to suppress the variation in spherical aberration. To further secure the advantageous effects of this embodiment, it is preferable to set the upper limit value of the conditional expression (7) to 0.95, 0.90, 0.85, 0.80, 0.75, 0.70, or further to 0.68, for example. It is preferable to set the lower limit value of the conditional expression (7) to 0.25, 0.30, 0.33, 0.35, 0.38, 0.40, 0.43, or further to 0.45, for example.

Preferably, in the zoom optical system described above, the following conditional expression (8) is satisfied, $$0.20 < dF1w/TLw < 0.50 \tag{8}$$

where dF1w: a distance from an object-side lens surface of the first focusing lens group to an image surface upon focusing on infinity in the wide angle end state, and TLw: an entire length of the optical system in the wide angle end state.

The conditional expression (8) defines the ratio between the distance from the object-side lens surface of the first focusing lens group to the image surface upon focusing on infinity in the wide angle end state, and the entire length of the optical system in the wide angle end state. It is thus defined that the first focusing lens group is positioned close to the image surface. To further secure the advantageous effects of this embodiment, it is preferable to set the upper limit value of the conditional expression (8) to 0.48, 0.47, 0.46, 0.45, or further to 0.44, for example. It is preferable to set the lower limit value of the conditional expression (8) to 0.23, 0.26, 0.29, 0.32, or further to 0.35, for example.

Preferably, in the zoom optical system described above, the following conditional expression (9) is satisfied, $$0.20 < dF2w/TLw < 0.50 \tag{9}$$

where dF2w: a distance from an object-side lens surface of the second focusing lens group to an image surface upon focusing on infinity in the wide angle end state, and TLw: an entire length of the optical system in the wide angle end state.

The conditional expression (9) defines the ratio between the distance from the object-side lens surface of the second focusing lens group to the image surface upon focusing on infinity in the wide angle end state, and the entire length of the optical system in the wide angle end state. It is thus defined that the second focusing lens group is positioned close to the image surface. To further secure the advantageous effects of this embodiment, it is preferable to set the upper limit value of the conditional expression (9) to 0.47, 0.44, 0.42, 0.40, or further to 0.37, for example. It is preferable to set the lower limit value of the conditional expression (9) to 0.23, 0.26, 0.28, 0.30, or further to 0.32, for example.

Preferably, in the zoom optical system described above, the first focusing lens group and the second focusing lens group are disposed adjacent to each other. This simplifies the movement control mechanism and the control for focusing.

Preferably, as to the zoom optical system described above, the zoom optical system further comprises the aperture stop, and the first focusing lens group and the second focusing lens group are each disposed closer to the image than the aperture stop. Accordingly, the variation in image magnification upon focusing can be suppressed.

Preferably, in the zoom optical system described above, the following conditional expression (10) is satisfied, $$1.00 < Bfw/IHw < 4.00 \tag{10}$$

where

Bfw: a back focus length in the wide angle end state, and

IHw: an image height in the wide angle end state.

The conditional expression (10) defines the ratio between the back focus length in the wide angle end state and the image height in the wide angle end state. Accordingly, the back focus length is made appropriate, and the final lens group is positioned at an appropriate position, thereby allowing the curvature of field to be favorably corrected. If the upper limit value of the conditional expression (10) is exceeded, which causes a problem in that the back focus length becomes too large. On the other hand, if the lower limit value of the conditional expression (10) is not reached, the back focus length becomes small, which causes a problem of increasing the distortion. To further secure the advantageous effects of this embodiment, it is preferable to set the upper limit value of the conditional expression (10) to 3.50, 3.00, 2.80, 2.50, 2.10, 2.00, 1.80, or further to 1.60, for example. It is preferable to set the lower limit value of the conditional expression (10) to 1.05, 1.10, 1.15, 1.20, 1.25, 1.30, 1.35, or further to 1.40, for example.

Preferably, in the zoom optical system described above, the following conditional expression (11) is satisfied, $$0.10 < 1/\beta WF1 < 1.00 \tag{11}$$

where $\beta WF1$: a magnification of the first focusing lens group upon focusing on infinity in the wide angle end state.

The conditional expression (11) defines an appropriate range of the reciprocal of the magnification of the first focusing lens group upon focusing on infinity in the wide angle end state. To further secure the advantageous effects of this embodiment, it is preferable to set the upper limit value of the conditional expression (11) to 0.95, 0.90, 0.85, 0.80, 0.75, 0.70, 0.68, 0.65, or further to 0.61, for example. It is preferable to set the lower limit value of the conditional expression (11) to 0.15, 0.20, 0.25, 0.30, 0.33, 0.35, 0.38, 0.40, 0.43, or further to 0.45, for example.

Preferably, in the zoom optical system described above, the following conditional expression (12) is satisfied, $$0.10 < 1/\beta WF2 < 1.00 \tag{12}$$

where $\beta WF2$: a magnification of the second focusing lens group upon focusing on infinity in the wide angle end state.

The conditional expression (12) defines an appropriate range of the reciprocal of the magnification of the second focusing lens group upon focusing on infinity in the wide angle end state. To further secure the advantageous effects of this embodiment, it is preferable to set the upper limit value of the conditional expression (12) to 0.95, 0.90, 0.85, 0.80, 0.75, 0.70, 0.68, 0.65, 0.63, 0.60, or further to 0.58, for example. It is preferable to set the lower limit value of the conditional expression (12) to 0.15, 0.20, 0.25, 0.30, 0.33, 0.35, 0.38, 0.40, 0.43, or further to 0.45, for example.

Preferably, in the zoom optical system described above, the following conditional expression (13) is satisfied, $$0.05 < (\beta WF1 + 1/\beta WF1)^{-2} < 0.25 \tag{13}$$

where $\beta WF1$: a magnification of the first focusing lens group upon focusing on infinity in the wide angle end state.

The conditional expression (13) defines an appropriate range of the relationship of the magnification of the first focusing lens group upon focusing on infinity in the wide angle end state. To further secure the advantageous effects of this embodiment, it is preferable to set the upper limit value of the conditional expression (13) to 0.24, 0.23, 0.22, 0.21, or further to 0.20, for example. It is preferable to set the lower limit value of the conditional expression (13) to 0.07, 0.09, 0.11, 0.13, or further to 0.15, for example.

Preferably, in the zoom optical system described above, the following conditional expression (14) is satisfied, $$0.05 < (\beta WF2 + 1/\beta WF2)^{-2} < 0.25 \tag{14}$$

where $\beta WF2$: a magnification of the second focusing lens group upon focusing on infinity in the wide angle end state.

The conditional expression (14) defines an appropriate range of the relationship of the magnification of the second focusing lens group upon focusing on infinity in the wide angle end state. To further secure the advantageous effects of this embodiment, it is preferable to set the upper limit value of the conditional expression (14) to 0.24, 0.23, 0.22, 0.21, or further to 0.20, for example. It is preferable to set the lower limit value of the conditional expression (14) to 0.07, 0.09, 0.11, 0.13, or further to 0.15, for example.

Preferably, in the zoom optical system described above, the following conditional expression (15) is satisfied, $$50.0° < 2\omega w \tag{15}$$

where $2\omega w$: a full angle of view (°) in the wide angle end state.

The conditional expression (15) defines the magnitude of the full angle of view of the zoom optical system in the wide angle end state. To further secure the advantageous effects of this embodiment, it is preferable to set the lower limit value of the conditional expression (15) to 45.0°, 40.0°, 35.0°, 30.0°, or further to 25.0°, for example.

Preferably, in the zoom optical system described above, the following conditional expression (16) is satisfied, $$2.00 < ft/fw < 8.00 \tag{16}$$

where ft: a focal length of the entire optical system upon focusing on infinity in the telephoto end state, and fw: a focal length of the entire optical system upon focusing on infinity in the wide angle end state.

The conditional expression (16) defines the ratio between the focal length of the entire optical system upon focusing on infinity in the telephoto end state, and the focal length of the entire optical system upon focusing on infinity in the wide angle end state. To further secure the advantageous effects of this embodiment, it is preferable to set the upper limit value of the conditional expression (16) to 7.00, 6.00, 5.00, 4.50, or further to 4.00, for example. It is preferable to set the lower limit value of the conditional expression (16) to 2.20, 2.50, 2.80, 3.00, or further to 3.50, for example.

Preferably, in the zoom optical system described above, the following conditional expression (17) is satisfied, $$0.70 < ft/TLt < 2.00 \tag{17}$$

where

TLt: an entire length of the optical system in the telephoto end state, and ft: a focal length of the entire optical system upon focusing on infinity in the telephoto end state.

The conditional expression (17) defines the ratio between the focal length of the entire optical system upon focusing on infinity in the telephoto end state, and the entire length of the optical system in the telephoto end state. By achieving the configuration satisfying the conditional expression (17), both reduction in size and weight of the zoom optical system, and favorable aberration correction can be compatibly achieved. If the upper limit value of the conditional expression (17) is exceeded, the entire length of the optical system in the telephoto end state becomes too large, which causes a problem in that the weight becomes too large. On the other hand, if the lower limit value of the conditional expression (17) is not reached, the entire length of the optical system in the telephoto end state becomes small, which causes a problem of making it difficult to achieve favorable aberration correction. To further secure the advantageous effects of this embodiment, it is preferable to set the upper limit value of the conditional expression (17) to 1.90, 1.80, 1.70, 1.65, 1.60, 1.55, or further to 1.50, for example. It is preferable to set the lower limit value of the conditional expression (17) to 0.80, 0.90, 1.00, 1.05, 1.10, 1.15, or further to 1.20, for example.

Subsequently, referring to FIG. 19, a method for manufacturing the optical system is schematically described. According to the manufacturing method, first, a first lens group having a positive refractive power, and a rear group including a plurality of lens groups, which are disposed in order from an object on the optical axis, are arranged in a lens barrel (step ST1). The configuration is then made so that upon zooming from the wide angle end to the telephoto end, the distance between the first lens group and the rear group changes, and the distances between lens groups constituting the rear group change (step ST2). The configuration is then made so that the rear group includes, in order from the object: a first focusing lens group having a negative refractive power; and a second focusing lens group having a negative refractive power, and both the first focusing lens group and the second focusing lens group move on the optical axis toward the image upon focusing from infinity to the short distance position (step ST3). The configuration is then made so as to satisfy the following conditional expression (1) (step ST4):

$$0.000 < (MWF1/MTF1)/(MWF2/MTF2) < 0.500 \quad (1)$$

where
MWF1: an amount of movement of the first focusing lens group upon focusing from infinity to the short distance position in a wide angle end state,
MTF1: an amount of movement of the first focusing lens group upon focusing from infinity to the short distance position in a telephoto end state,
MWF2: an amount of movement of the second focusing lens group upon focusing from infinity to the short distance position in the wide angle end state,
MTF2: an amount of movement of the second focusing lens group upon focusing from infinity to the short distance position in the telephoto end state, and
all the amounts of movement toward the image are chosen to be positive.

The zoom optical system according to this embodiment described above, and the camera (optical apparatus) including the zoom optical system, and the zoom optical system manufactured by the aforementioned manufacturing method can allow the amounts of movement of the first and second focusing lens groups GF1 and GF2 upon focusing to be different between in the wide angle end state and in the telephoto end state, favorably correct the variation in curvature of field prone to cause a problem in the wide angle end state, and favorably correct the variation in spherical aberration prone to cause a problem in the telephoto end state, and can thus achieve an optical system with aberrations being favorably corrected over the entire zooming region.

EXAMPLES

Hereinafter, zoom optical systems ZL according to specific examples of the aforementioned embodiment are described with reference to the drawings. FIGS. 1, 4, 7, 10, 13 and 16 are sectional views respectively showing the configurations and the refractive power allocations of zoom optical systems ZL {ZL(1) to ZL(6)} according to the first to sixth examples. In each sectional view, the moving direction of each lens group on the optical axis upon zooming from the wide angle end state (W) to the telephoto end state (T) is indicated by an arrow. Furthermore, the moving direction of the focusing lens group upon focusing from infinity to a short distance object is indicated by an arrow accompanied by characters "FOCUSING".

In these diagrams (FIGS. 1, 4, 7, 10, 13 and 16), each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an example-by-example basis. Accordingly, even when the same combination of a symbol and a numeral is used among examples, such usage does not necessarily mean the same configuration.

FIGS. 2A and 2B and FIGS. 3A and 3B, FIGS. 5A and 5B and 6A and 6B, FIGS. 8A and 8B and FIGS. 9A and 9B, FIGS. 11A and 11B and FIGS. 12A and 12B, FIGS. 14A and 14B and FIGS. 15A and 15B, and FIGS. 17A and 17B and FIGS. 18A and 18B show various aberrations of the zoom optical systems ZL(1) to ZL(6) according to the first to sixth examples. In these diagrams, FNO indicates the f-number, NA indicates the numerical aperture, and Y indicates the image height. The spherical aberration graph indicates the value of the f-number or the numerical aperture that corresponds to the maximum aperture. The astigmatism graph and the distortion graph each indicate the maximum value of the image height. The coma aberration graph indicates the value of the corresponding image height. The symbol d indicates d-line ($\lambda$=587.6 nm). The symbol g indicates g-line ($\lambda$=435.8 nm). In the astigmatism graph, a solid line indicates a sagittal image surface, and a broken line indicates a meridional image surface. The distortion graph shows the distortion with reference to d-line. The graph of chromatic aberration of magnification shows the chromatic aberration of magnification with reference to g-line.

Hereinafter, Tables 1 to 6 are shown. Among these tables, Table 1 is a table showing each data item in the first example, Table 2 is that in the second example, Table 3 is that in the third example, Table 4 is that in the fourth example, Table 5 is that in the fifth example, and Table 6 is that in the sixth example. In each example, as targets of calculation of aberration characteristics, d-line (wavelength $\lambda$=587.6 nm), and g-line (wavelength $\lambda$=435.8 nm) are selected.

In the table of [General Data], FNO indicates the f-number, and 2$\omega$ indicates the angle of view (the unit is ° (degrees), and $\omega$ indicates the half angle of view). TL indicates a distance obtained by adding the back focus Bf to the distance on the optical axis from the lens foremost surface to the lens last surface. Bf indicates the air equivalent distance (back focus) on the optical axis from the lens last surface to the image surface I upon focusing on infinity. Note that these values are indicated for corresponding zoom states at the wide angle end (W), the intermediate focal length (M), and the telephoto end (T).

In the table of [Lens Data], Surface Number (the number of the field indicated by characters of Surface) indicates the order of the optical surface from the object side along the direction in which the ray travels, R indicates the radius of curvature (the surface whose center of curvature resides on the image side is regarded to have a positive value) of each optical surface, D indicates the surface distance on the optical axis from each optical surface to the next optical surface (or the image surface), nd is the refractive index of the material of the optical member for d-line, and vd indicates the Abbe number of the material of the optical member with reference to d-line. The radius of curvature "∞" indicates a plane or an opening. (Aperture stop S) indicates an aperture stop. The description of the air refractive index nd=1.00000 is omitted.

The table of [Lens Group Data] shows the first surface (the surface closest to the object) of each lens group, and the focal length of the corresponding lens group.

The table of [Variable Distance Data] shows the surface distance at each surface number where the surface distance is "Variable" in the table showing [Lens Data]. Here, for cases of focusing on infinity and a short distance, the surface distances in each of zooming states at the wide angle end (W), the intermediate focal length (M) and the telephoto end (T) are shown in a manner classified into a case of focusing at a normal distance and a case of focusing at a short distance. Note that the first row indicates the entire focal length f (the case of focusing at a normal distance) or the lateral magnification β (the case of focusing at a short distance) in each zooming state.

The table [Each group magnification] shows the lateral magnification β of each lens group, in each of zooming states at the wide angle end (W), the intermediate focal length (M) and the telephoto end (T), in a manner classified into a case of focusing at a normal distance and a case of short distance.

The table of [Other data] shows MWF1, MTF1, MWF2, MTF2, fF1, fF2, fR, dF1w, dF2w, and IHw that are the corresponding values of each conditional expression, for each example.

Tables of [Conditional Expression Corresponding Value] are provided at the end of the description of every example (first to sixth examples). This table collectively indicates values corresponding to the conditional expressions with respect to all the examples (first to sixth examples).

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited thereto.

The descriptions of the tables so far are common to all the examples. Redundant descriptions are hereinafter omitted.

First Example

A first example is described with reference to FIGS. 1 to 3A and 3B and Table 1. FIG. 1 is a lens configuration diagram of a zoom optical system according to the first example. The zoom optical system ZL(1) according to the first example consists of, in order from the object: a first lens group G1 having a positive refractive power; a second lens group G2 having a negative refractive power; a third lens group G3 having a negative refractive power; a fourth lens group G4 having a positive refractive power; an aperture stop S disposed in the fourth lens group G4; a fifth lens group G5 having a negative refractive power; a sixth lens group G6 having a negative refractive power; and a seventh lens group G7 having a positive refractive power. Note that an imaging element 4 that includes an image surface I is disposed on the image-side of the seventh lens group G7.

Upon zooming from the wide angle end state (W) to the telephoto end state (T), the first lens group G1, and the third to sixth lens groups G3 to G6 move in the optical axis direction as indicated by arrows in FIG. 1, and the distances between lens groups adjacent to each other change. Note that the second and seventh lens groups G2 and G7 are fixed and stationary upon zooming. Note that the lens group that consists of the second to seventh lens groups G2 to G7 corresponds to the rear group GR. A sign (+) or (−) assigned to each lens group symbol indicates the refractive power of the corresponding lens group. This indication similarly applies to all the following examples.

The first lens group G1 consists of, in order from the object: a biconvex positive lens L11; and a convexo-plane-shaped positive lens L12 that includes an object-side surface as a convex surface facing the object, and an image-side surface as a planar surface.

The second lens group G2 consists of, in order from the object: a cemented lens including a biconvex positive lens L21, and a biconcave negative lens L22; and a biconvex positive lens L23.

The third lens group G3 consists of, in order from the object: a cemented lens including a biconvex positive lens L31, and a biconcave negative lens L32; a cemented lens including a biconcave negative lens L33, and a positive meniscus lens L34 having a convex surface facing the object; and a biconcave negative lens L35.

The fourth lens group G4 consists of, in order from the object: a biconvex positive lens L41; a biconvex positive lens L42; a positive meniscus lens L43 having a convex surface facing the object; a biconcave negative lens L44; an aperture stop S; a biconvex positive lens L45; a negative meniscus lens L46 having a convex surface facing the object; a cemented lens including a biconvex positive lens L47, and a negative meniscus lens L48 having a concave surface facing the object; and a positive meniscus lens L49 having a convex surface facing the object. Note that the cemented lens including the positive lens L47 and the negative meniscus lens L48 is a vibration proof lens controlled to move perpendicular to the optical axis. Camera shake correction and the like are performed by this lens.

The fifth lens group G5 consists of, in order from the object, a cemented lens including a biconvex positive lens L51 and a biconcave negative lens L52. The fifth lens group G5 constitutes a first focusing lens group GF1 that is moved upon focusing.

The sixth lens group G6 consists of a biconvex positive lens L61, and a biconcave negative lens L62. The sixth lens group G6 constitutes a second focusing lens group GF2 that is moved upon focusing.

The seventh lens group G7 consists of, in order from the object: a biconvex positive lens L71; and a biconcave negative lens L72.

In this example, as described above, the fifth lens group G5 constitutes the first focusing lens group GF1, and the sixth lens group G6 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 1 lists values of data on the zoom optical system according to the first example.

TABLE 1

| [General Data] | | | |
|---|---|---|---|
| | W | M | T |
| Entire Focal length f | 103.00 | 200.00 | 387.99 |
| Fno. | 4.60 | 5.00 | 5.83 |
| 2ω | 24.00 | 12.20 | 61.00 |
| Entire Length TL | 232.05 | 265.48 | 281.55 |
| Bf | 31.20 | 31.20 | 31.20 |

| [Lens Data] | | | | |
|---|---|---|---|---|
| Surface | R | D | nd | νd |
| 1) | 294.7249 | 4.600 | 1.48749 | 70.31 |
| 2) | −1000.0000 | 0.150 | | |
| 3) | 141.5731 | 5.900 | 1.43385 | 95.25 |
| 4) | 0.0000 | (d1) Variable | | |
| 5) | 80.5202 | 5.700 | 1.49782 | 82.57 |
| 6) | −1012.9343 | 1.800 | 1.83400 | 37.18 |
| 7) | 57.2316 | 0.200 | | |
| 8) | 53.8652 | 6.800 | 1.43700 | 95.00 |
| 9) | −5797.7083 | (d2) Variable | | |
| 10) | 130.2730 | 4.800 | 1.72047 | 34.71 |
| 11) | −69.0469 | 1.300 | 1.49782 | 82.57 |
| 12) | 72.3815 | 3.194 | | |
| 13) | −153.7759 | 1.200 | 1.65160 | 58.62 |
| 14) | 38.0000 | 3.100 | 1.85478 | 24.80 |
| 15) | 90.1995 | 3.588 | | |
| 16) | −63.7942 | 1.200 | 1.75500 | 52.34 |
| 17) | 157.6117 | (d3) Variable | | |
| 18) | 129.1207 | 3.500 | 1.59319 | 67.90 |
| 19) | −140.7152 | 0.150 | | |
| 20) | 60.0694 | 4.000 | 1.49782 | 82.57 |
| 21) | −1651.5770 | 0.150 | | |
| 22) | 39.8879 | 4.100 | 1.49782 | 82.57 |
| 23) | 163.2683 | 2.145 | | |
| 24) | −220.5817 | 1.600 | 1.95375 | 32.33 |
| 25) | 106.9215 | 4.078 | | |
| 26) | ∞ | 11.253 | Aperture stop | |
| 27) | 4136.1631 | 2.463 | 1.85478 | 24.80 |
| 28) | −99.1304 | 0.200 | | |
| 29) | 114.5157 | 1.200 | 1.95375 | 32.33 |
| 30) | 35.7902 | 2.748 | | |
| 31) | 57.1849 | 5.300 | 1.61272 | 58.54 |
| 32) | −38.4615 | 1.000 | 1.80100 | 34.92 |
| 33) | −115.9224 | 1.000 | | |
| 34) | 37.5625 | 2.800 | 1.69680 | 55.52 |
| 35) | 86.8987 | (d4) Variable | | |
| 36) | 98.0479 | 2.600 | 1.80610 | 33.34 |
| 37) | −83.3333 | 1.100 | 1.76385 | 48.49 |
| 38) | 37.9496 | (d5) Variable | | |
| 39) | 266.0993 | 3.300 | 1.54814 | 45.51 |
| 40) | −38.2062 | 4.120 | | |
| 41) | −32.0966 | 1.100 | 1.76385 | 48.49 |
| 42) | 153.7540 | (d6) Variable | | |
| 43) | 300.8153 | 5.156 | 1.67300 | 38.15 |
| 44) | −65.2552 | 0.200 | | |
| 45) | −101.2915 | 1.400 | 1.5186 | 69.89 |
| 46) | 200.0000 | 31.205 | BF | |
| Image Surface (I) | ∞ | | | |

| [Lens Group Data] | | |
|---|---|---|
| Group | First surface | Focal length |
| f1 | 1 | 192.882 |
| f2 | 5 | −3076.438 |
| f3 | 10 | −44.260 |
| f4 | 18 | 46.122 |
| f5 | 36 | −90.434 |
| f6 | 39 | −96.365 |
| f7 | 43 | 205.898 |

TABLE 1-continued

| | W infinity | M infinity | T infinity | W vicinity | M vicinity | T vicinity |
|---|---|---|---|---|---|---|
| | | | [Variable Distance Data] | | | |
| f(β) | 102.99983 | 199.99921 | 387.99209 | −0.12360 | −0.21443 | −0.37546 |
| (d1) | 1.50000 | 34.93259 | 51.00000 | 1.50000 | 34.93259 | 51.0000 |
| (d2) | 2.48427 | 18.46128 | 29.95595 | 2.48427 | 18.46128 | 29.95595 |
| (d3) | 43.90944 | 24.14038 | 1.50000 | 43.90944 | 24.14038 | 1.5000 |
| (d4) | 2.14279 | 5.90020 | 2.11356 | 2.90132 | 13.81733 | 33.11385 |
| (d5) | 9.85398 | 3.84270 | 12.42643 | 17.52266 | 8.74733 | 11.10598 |
| (d6) | 30.76333 | 36.80909 | 43.15893 | 22.33633 | 23.98726 | 13.48202 |
| | | | [Each Group Magnification] | | | |
| G1 | 0.00000 | 0.00000 | 0.00000 | −0.34636 | −0.36854 | −0.37928 |
| G2 | 1.03180 | 1.02036 | 1.01495 | 1.05545 | 1.04500 | 1.04005 |
| G3 | −0.38086 | −0.68055 | −1.19939 | −0.23423 | −0.31428 | −0.38782 |
| G4 | −0.57285 | −0.62320 | −0.62049 | −0.62308 | −0.79801 | −1.20075 |
| G5 | 1.68587 | 1.64195 | 1.75887 | 1.73630 | 1.64628 | 1.62495 |
| G6 | 1.69072 | 1.75343 | 1.81932 | 1.60329 | 1.62038 | 1.51141 |
| G7 | 0.83223 | 0.83224 | 0.83224 | 0.83223 | 0.83224 | 0.83223 |

| [Other Data] | |
|---|---|
| MWF1 | 0.757 |
| MTF1 | 30.994 |
| MWF2 | 8.426 |
| MTF2 | 29.673 |
| fF1 | −90.434 |
| fF2 | −96.365 |
| fR | 205.898 |
| dF1W | 90.796 |
| dF2W | 77.242 |
| IHw | 21.60 |

Figure 2A:
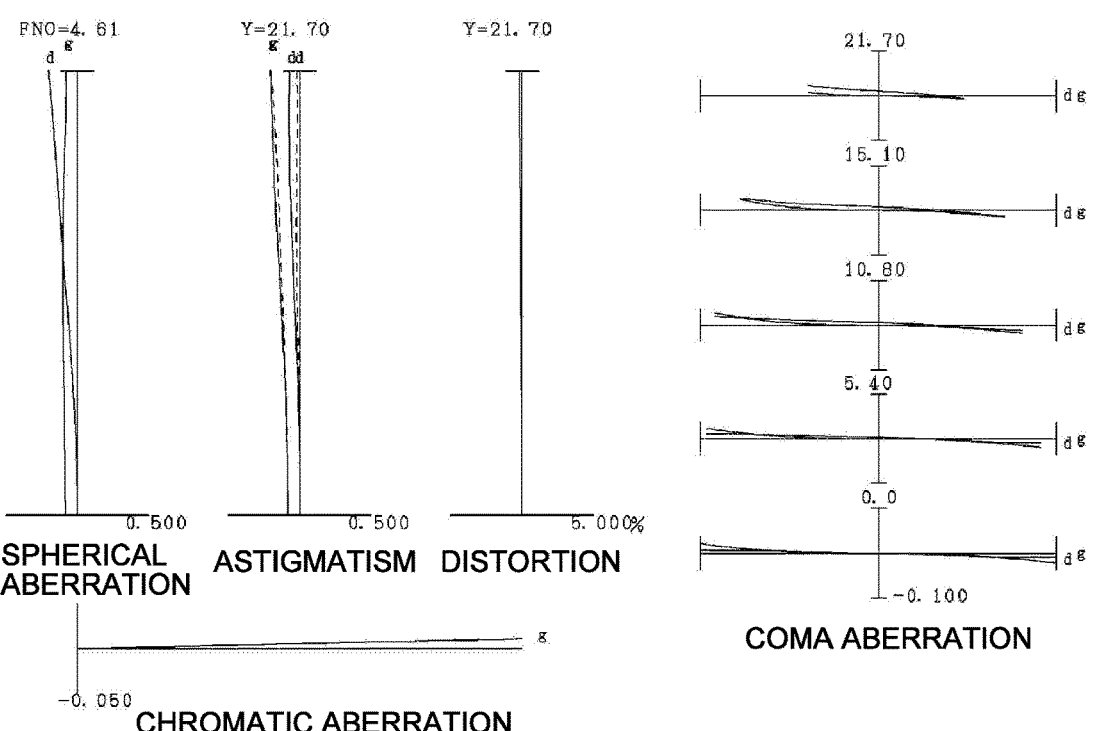
FIGS. 2A and 2B are graphs respectively showing various aberrations of the zoom optical system according to the first example upon focusing on infinity in a wide angle end state and a telephoto end state.
Figure 2B:
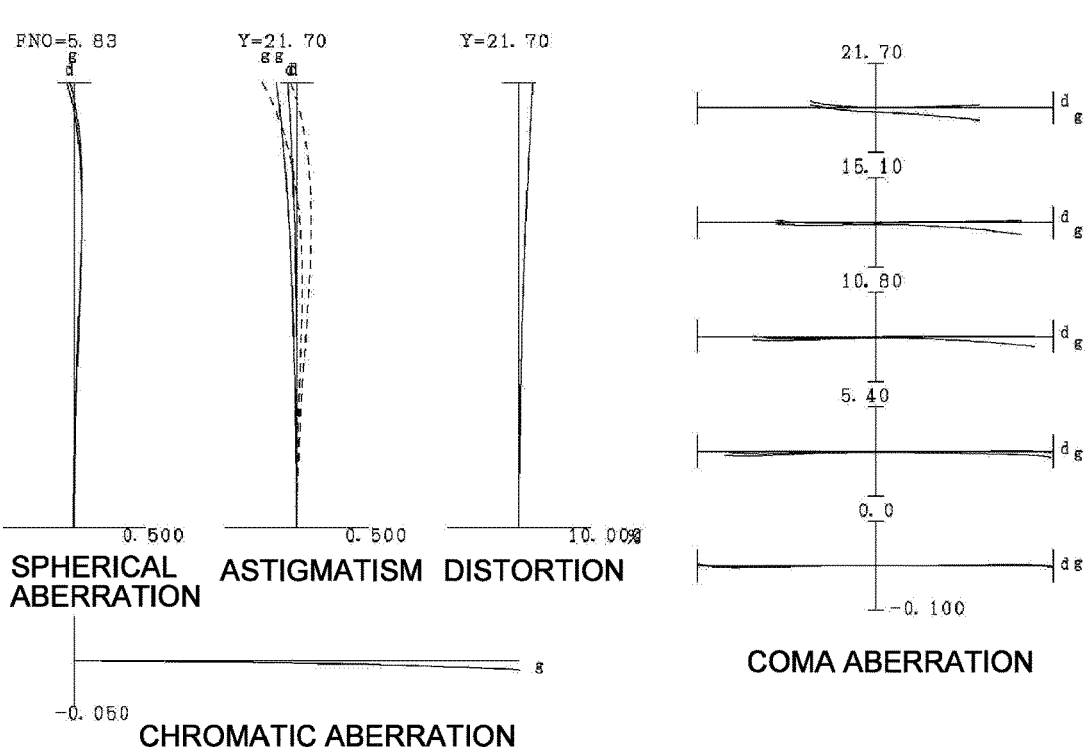
Figure 3A:
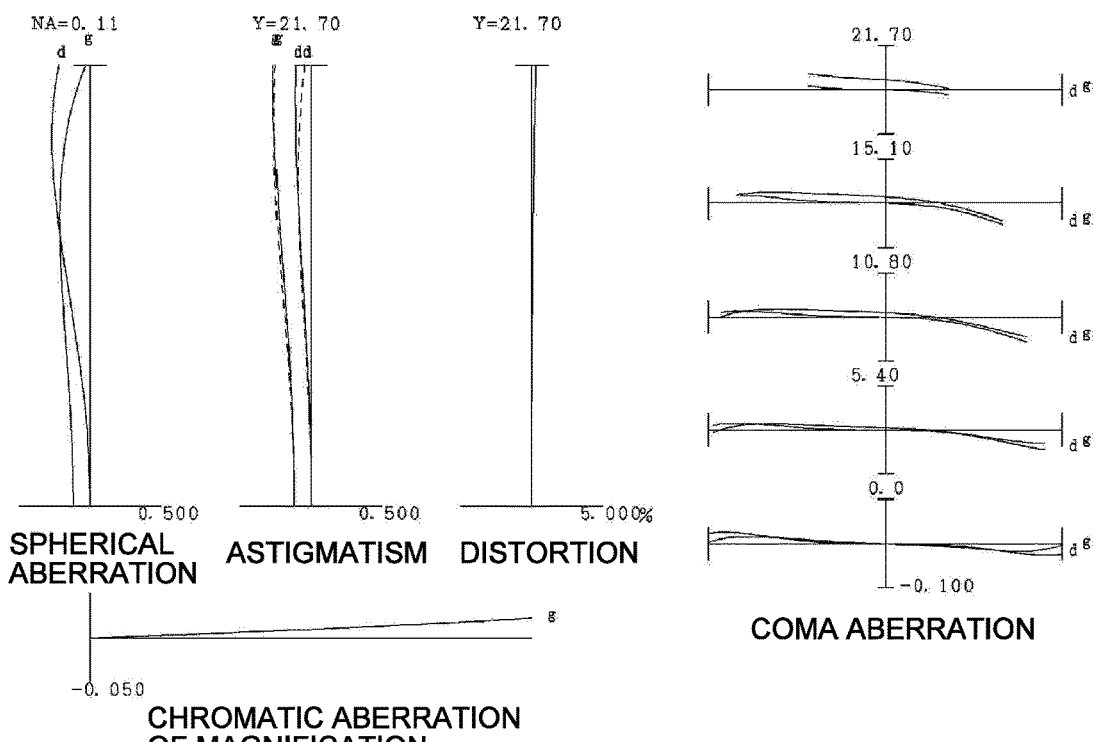
FIGS. 3A and 3B are graphs respectively showing various aberrations of the zoom optical system according to the first example upon short-distance focusing in the wide angle end state and the telephoto end state.
Figure 3B:
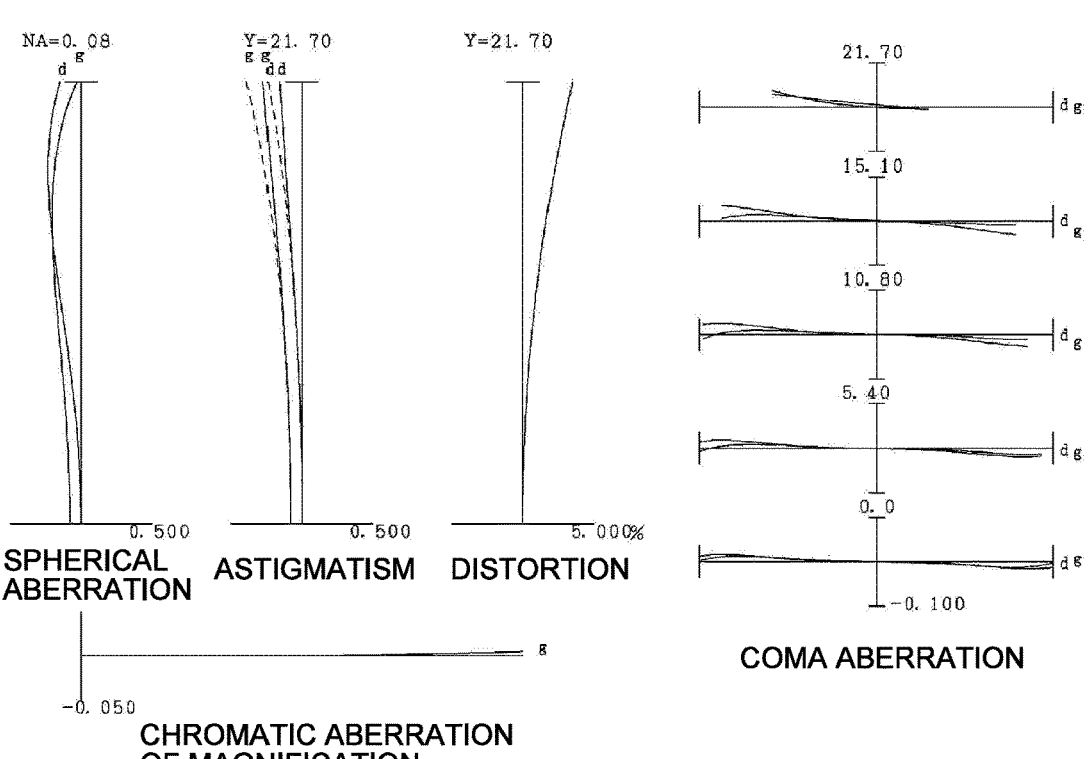

FIGS. 2A and 2B are graphs respectively showing various aberrations of the zoom optical system according to the first example upon focusing on infinity in a wide angle end state and a telephoto end state. FIGS. 3A and 3B are graphs respectively showing various aberrations of the zoom optical system according to the first example upon focusing on a short distance object in the wide angle end state and the telephoto end state.

In each of the graphs of FIGS. 2A and 2B, FNO indicates the f-number, and Y indicates the image height. The spherical aberration graph indicates the value of the f-number corresponding to the maximum diameter. The astigmatism graph and the distortion graph each indicate the maximum value of the image height. The lateral aberration graph indicates the value of the corresponding image height. In each of the graphs of FIGS. 3A and 3B, NA indicates the numerical aperture, and Y indicates the image height. The spherical aberration graph indicates the value of the numerical aperture corresponding to the maximum diameter. The astigmatism graph and the distortion graph each indicate the maximum value of the image height. The coma aberration graph indicates the value of the corresponding image height. In each aberration graph, the symbol d indicates d-line (wavelength λ=587.6 nm). The symbol g indicates g-line (wavelength λ=435.8 nm). In the astigmatism graph, a solid line indicates a sagittal image surface, and a broken line indicates a meridional image surface. Note that also in the following aberration graphs in each example, symbols similar to those in this example are used, and redundant description is omitted.

The graphs showing various aberrations exhibit that the zoom optical system according to the first example favorably corrects various aberrations and has an excellent imaging performance from the wide angle end state to the telephoto end state, and further has an excellent imaging performance also upon focusing on the short distance object.

Second Example

Figure 4:
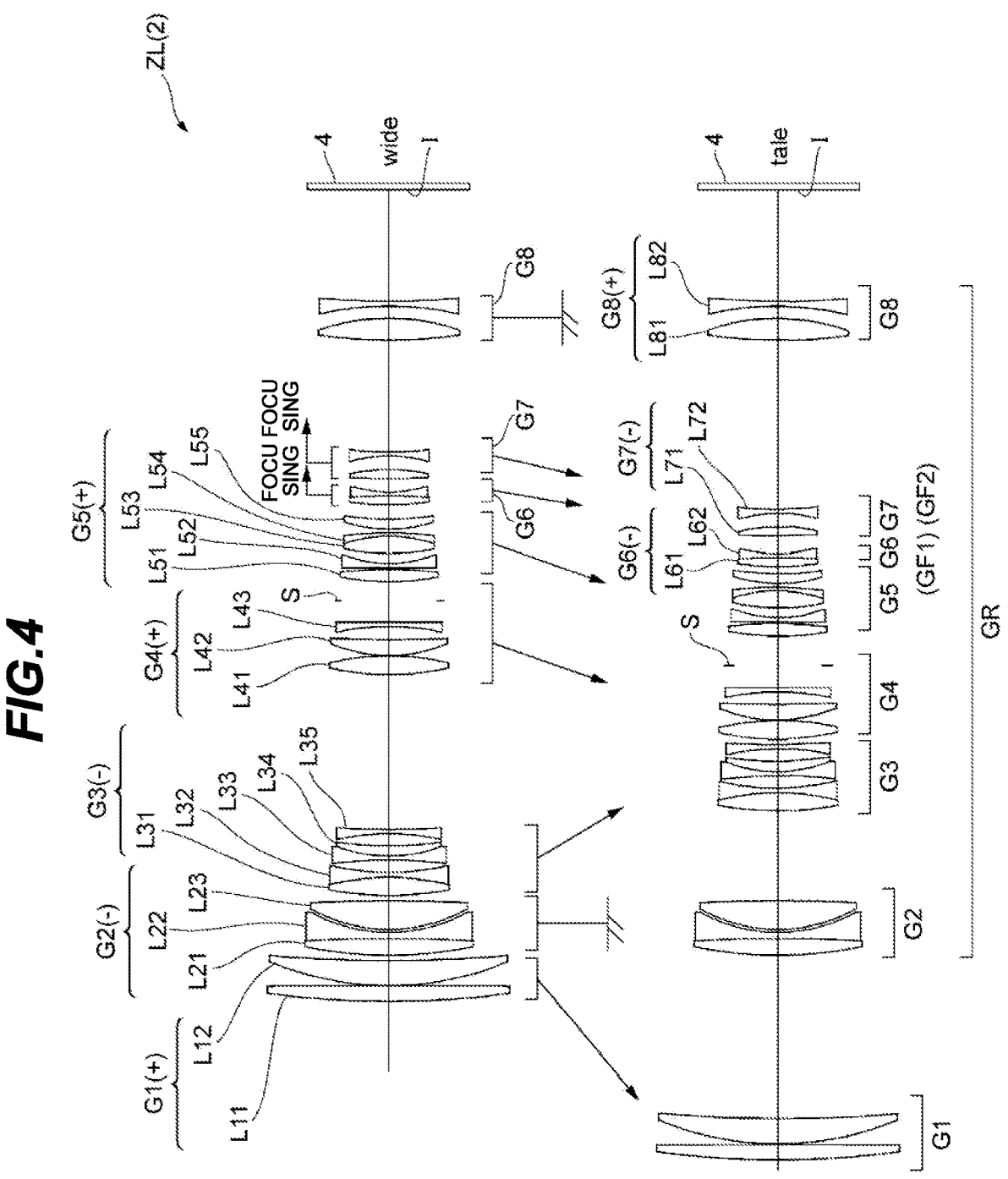
FIG. 4 shows a lens configuration of a zoom optical system according to a second example.

A second example is described with reference to FIGS. 4 to 6A and 6B and Table 2. FIG. 4 is a lens configuration diagram of a zoom optical system according to the second example. The zoom optical system ZL(2) according to the second example consists of, in order from the object: a first lens group G1 having a positive refractive power; a second lens group G2 having a negative refractive power; a third lens group G3 having a negative refractive power; a fourth lens group G4 having a positive refractive power; an aperture stop S; a fifth lens group G5 having a positive refractive power; a sixth lens group G6 having a negative refractive power; a seventh lens group G7 having a negative refractive power; and an eighth lens group G8 having a positive refractive power. Note that an imaging element 4 that includes an image surface I is disposed on the image-side of the eighth lens group G8.

Upon zooming from the wide angle end state (W) to the telephoto end state (T), the first lens group G1, and the third to seventh lens groups G3 to G7 move in the axial direction as indicated by arrows in FIG. 4, and the distances between lens groups adjacent to each other change. Note that the second and eighth lens groups G2 and G8 are fixed and stationary upon zooming. Note that the lens group that consists of the second to eighth lens groups G2 to G8 corresponds to the rear group GR.

The first lens group G1 consists of, in order from the object: a biconvex positive lens L11; and a positive meniscus lens L12 having a convex surface facing the object.

The second lens group G2 consists of, in order from the object: a cemented lens including a biconvex positive lens L21, and a biconcave negative lens L22; and a biconvex positive lens L23.

The third lens group G3 consists of, in order from the object: a cemented lens including a biconvex positive lens L31, and a biconcave negative lens L32; a cemented lens including a biconcave negative lens L33, and a positive meniscus lens L34 having a convex surface facing the object; and a biconcave negative lens L35.

The fourth lens group G4 consists of, in order from the object: a biconvex positive lens L41; a positive meniscus lens L42 having a convex surface facing the object; a negative meniscus lens L43 having a concave surface facing the object; and an aperture stop S. The aperture stop S is provided on the image-side of the fourth lens group G4, and moves with the fourth lens group G4 upon zooming.

The fifth lens group G5 consists of, in order from the object: a biconvex positive lens L51; a negative meniscus lens L52 having a convex surface facing an object; a cemented lens including a biconvex positive lens L53 and a negative meniscus lens L54 having a concave surface facing the object; and a positive meniscus lens L55 having a convex surface facing the object. Note that the cemented lens including the positive lens L53 and the negative meniscus lens L54 is a vibration proof lens controlled to move perpendicular to the optical axis. Camera shake correction and the like are performed by this lens.

The sixth lens group G6 consists of a cemented lens including a biconvex positive lens L61 and a biconcave negative lens L62. The sixth lens group G6 constitutes a first focusing lens group GF1 that is moved upon focusing.

The seventh lens group G7 consists of, in order from the object: a biconvex positive lens L71; and a biconcave negative lens L72. The seventh lens group G7 constitutes a second focusing lens group GF2 that is moved upon focusing.

The eighth lens group G8 consists of, in order from the object: a biconvex positive lens L81; and a biconcave negative lens L82.

In this example, as described above, the sixth lens group G6 constitutes the first focusing lens group GF1, and the seventh lens group G7 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 2 lists values of data on the zoom optical system according to the second example.

TABLE 2

| [General Data] | | | |
|---|---|---|---|
| | W | M | T |
| Entire Focal length f | 103.00 | 200.00 | 387.97 |
| Fno. | 4.62 | 5.07 | 5.83 |
| 2ω | 24.00 | 12.20 | 61.00 |
| Entire Length TL | 232.05 | 261.04 | 275.05 |
| Bf | 31.50 | 31.50 | 31.50 |

| [Lens Data] | | | |
|---|---|---|---|
| Surface | R | D | nd | vd |
|---|---|---|---|---|
| 1) | 254.5101 | 4.350 | 1.48749 | 70.31 |
| 2) | −4661.3201 | 0.150 | | |
| 3) | 88.4110 | 7.050 | 1.43385 | 95.25 |
| 4) | 400.7827 | (d1) Variable | | |
| 5) | 116.1000 | 4.700 | 1.66382 | 27.35 |
| 6) | −419.0650 | 1.800 | 1.79504 | 28.69 |
| 7) | 46.0318 | 0.823 | | |
| 8) | 44.9547 | 8.100 | 1.43385 | 95.25 |
| 9) | −480.0222 | (d2) Variable | | |
| 10) | 92.7373 | 5.100 | 1.73800 | 32.26 |
| 11) | −69.3366 | 1.300 | 1.59319 | 67.90 |
| 12) | 71.8114 | 3.466 | | |
| 13) | −140.3535 | 1.200 | 1.69680 | 55.52 |
| 14) | 40.4618 | 2.954 | 1.85478 | 24.80 |
| 15) | 100.3758 | 3.486 | | |
| 16) | −63.7973 | 1.200 | 1.75500 | 52.34 |
| 17) | 234.6595 | (d3) Variable | | |
| 18) | 72.3324 | 5.300 | 1.59319 | 67.90 |
| 19) | −73.8019 | 0.150 | | |
| 20) | 42.6484 | 4.500 | 1.49782 | 82.57 |
| 21) | 431.3957 | 3.509 | | |
| 22) | −72.0238 | 1.300 | 2.00100 | 29.12 |
| 23) | −4687.4044 | 6.159 | | |
| 24) | 0.0000 | (d4) Variable | | Aperture stop S |
| 25) | 71.8427 | 3.621 | 1.85478 | 24.80 |
| 26) | −106.9091 | 0.399 | | |
| 27) | 5385.8199 | 1.200 | 2.00069 | 25.46 |
| 28) | 33.8729 | 2.886 | | |
| 29) | 57.6879 | 4.900 | 1.63854 | 55.34 |

TABLE 2-continued

| | | | | |
|---|---|---|---|---|
| 30) | −39.0854 | 1.000 | 1.90366 | 31.27 |
| 31) | −96.1148 | 1.000 | | |
| 32) | 40.0604 | 2.800 | 1.72825 | 28.38 |
| 33) | 79.7455 | (d5) Variable | | |
| 34) | 85.7638 | 2.500 | 1.85026 | 32.35 |
| 35) | −165.1788 | 1.100 | 1.76385 | 48.49 |
| 36) | 33.7179 | (d6) Variable | | |
| 37) | 444.8513 | 2.500 | 1.72342 | 38.03 |
| 38) | −50.4431 | 3.854 | | |
| 39) | −38.9881 | 1.100 | 1.76385 | 48.49 |
| 40) | 100.0000 | (d7) Variable | | |
| 41) | 143.1093 | 6.156 | 1.57957 | 53.74 |
| 42) | −60.5733 | 3.433 | | |
| 43) | −86.3987 | 1.400 | 1.59349 | 67.00 |
| 44) | 222.7374 | 31.497 | | |
| Image Surface (I) | ∞ | | | |

[Lens Group Data]

| Group | First surface | Focal length |
|---|---|---|
| f1 | 1 | 170.700 |
| f2 | 5 | −950.061 |
| f3 | 10 | −45.239 |
| f4 | 18 | 64.817 |
| f5 | 25 | 70.591 |
| f6 | 34 | −84.939 |
| f7 | 37 | −104.473 |
| f8 | 41 | 220.221 |

| | W infinity | M infinity | T infinity | W vicinity | M vicinity | T vicinity |
|---|---|---|---|---|---|---|
| [Variable Distance Data] | | | | | | |
| f($\beta$) | 102.99938 | 199.99617 | 387.97105 | −0.12458 | −0.21808 | −0.39531 |
| (d1) | 1.50000 | 32.48957 | 46.50401 | 1.50000 | 32.48957 | 46.50401 |
| (d2) | 1.50000 | 17.04310 | 25.56630 | 1.50000 | 17.04310 | 25.56630 |
| (d3) | 43.89766 | 26.47342 | 1.50000 | 43.89766 | 26.47342 | 1.50000 |
| (d4) | 5.39936 | 2.02596 | 8.22461 | 5.39936 | 2.02596 | 8.22461 |
| (d5) | 4.09244 | 4.40192 | 2.07438 | 4.99554 | 10.76354 | 33.81074 |
| (d6) | 3.86242 | 3.56442 | 5.13972 | 11.19555 | 14.17497 | 4.26214 |
| (d7) | 31.85464 | 37.09707 | 48.10496 | 23.61780 | 20.12431 | 17.25032 |
| [Each Group Magnification] | | | | | | |
| G1 | 0.00000 | 0.00000 | 0.00000 | −0.29395 | −0.31063 | −0.31771 |
| G2 | 1.18881 | 1.14443 | 1.12543 | 1.26845 | 1.22252 | 1.20270 |
| G3 | −0.37943 | −0.73530 | −1.29435 | −0.23212 | −0.33335 | −0.41750 |
| G4 | −1.75685 | −1.82230 | −1.80618 | −2.14414 | −3.72832 | 17.13880 |
| G5 | 0.32657 | 0.31546 | 0.32601 | 0.29259 | 0.20325 | −0.06979 |
| G6 | 1.70275 | 1.71912 | 1.77601 | 1.75538 | 1.77514 | 1.64540 |
| G7 | 1.73596 | 1.78608 | 1.89139 | 1.65713 | 1.62364 | 1.59616 |
| G8 | 0.78878 | 0.78880 | 0.78882 | 0.78878 | 0.78879 | 0.78879 |

[Other Data]

| | |
|---|---|
| MWF1 | 0.903 |
| MTF1 | 31.725 |
| MWF2 | 8.237 |
| MTF2 | 30.847 |
| fF1 | −84.939 |
| fF2 | −104.473 |
| fR | 220.221 |
| dF1W | 89.258 |
| dF2W | 81.796 |
| IHw | 21.60 |

Figure 5A:
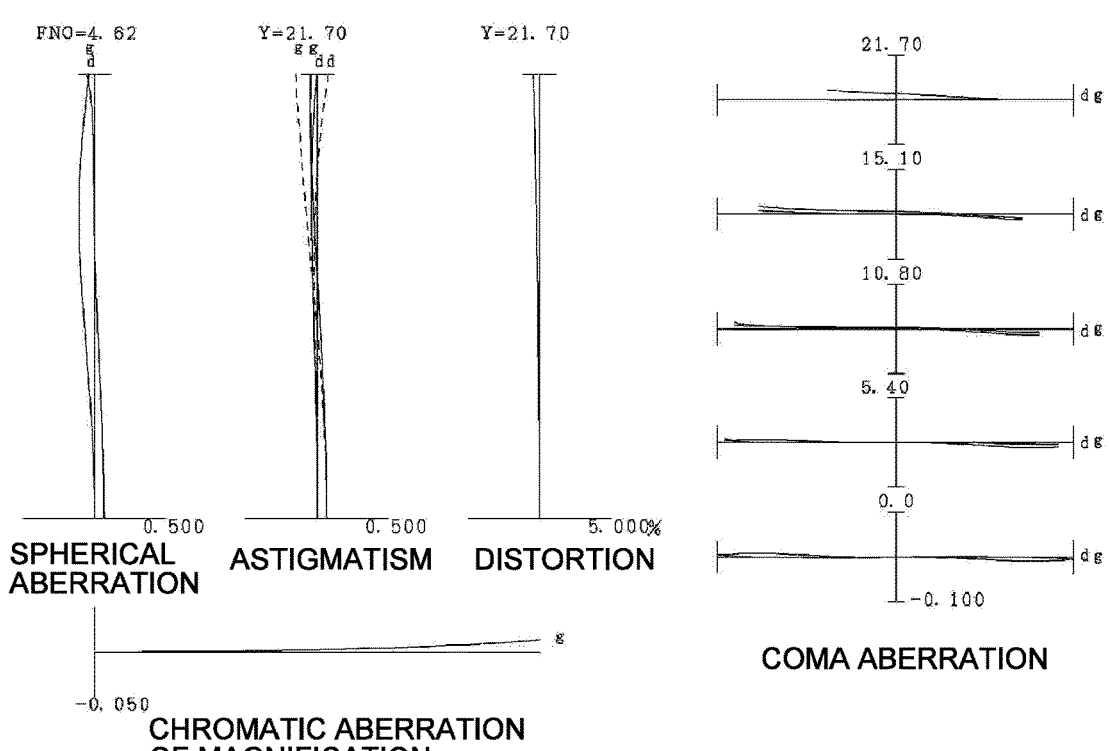
FIGS. 5A and 5B are graphs respectively showing various aberrations of the zoom optical system according to the second example upon focusing on infinity in a wide angle end state and a telephoto end state.
Figure 5B:
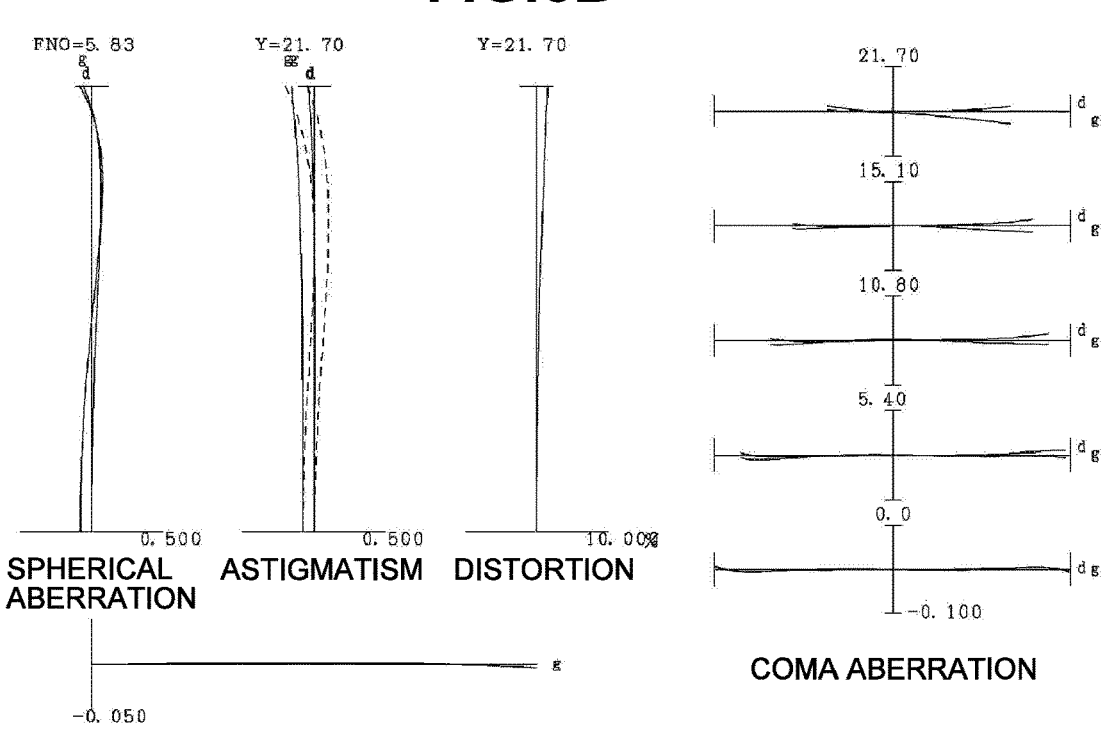
Figure 6A:
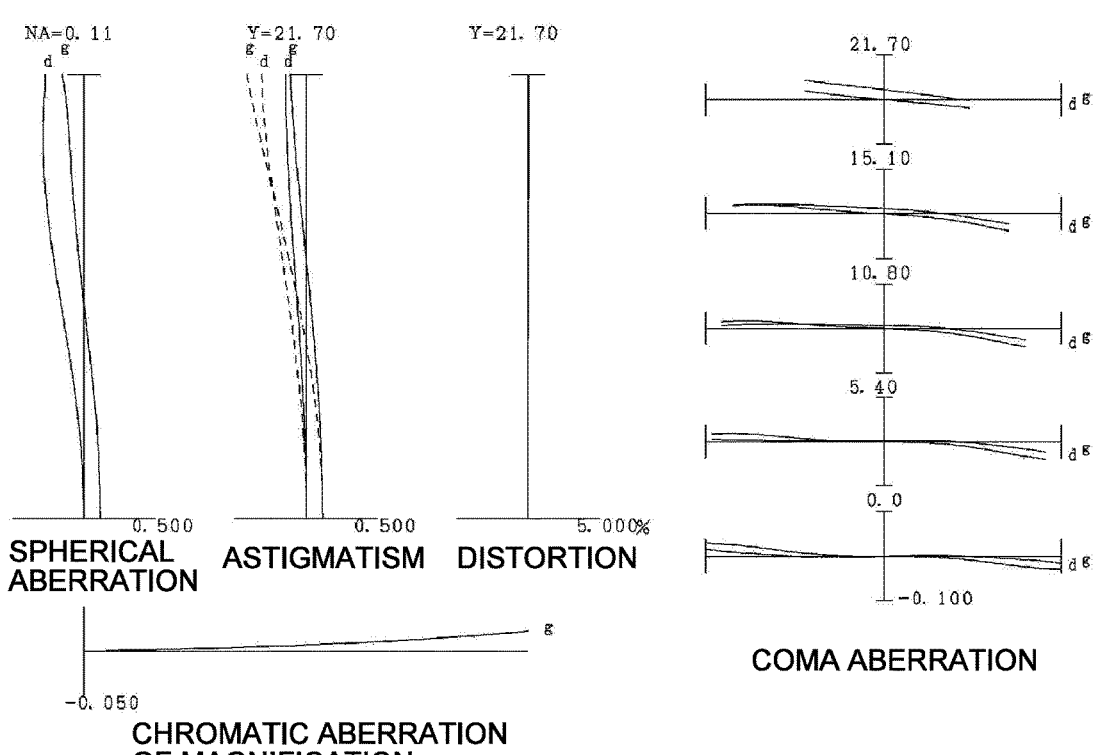
FIGS. 6A and 6B are graphs respectively showing various aberrations of the zoom optical system according to the second example upon short-distance focusing in the wide angle end state and the telephoto end state.
Figure 6B:
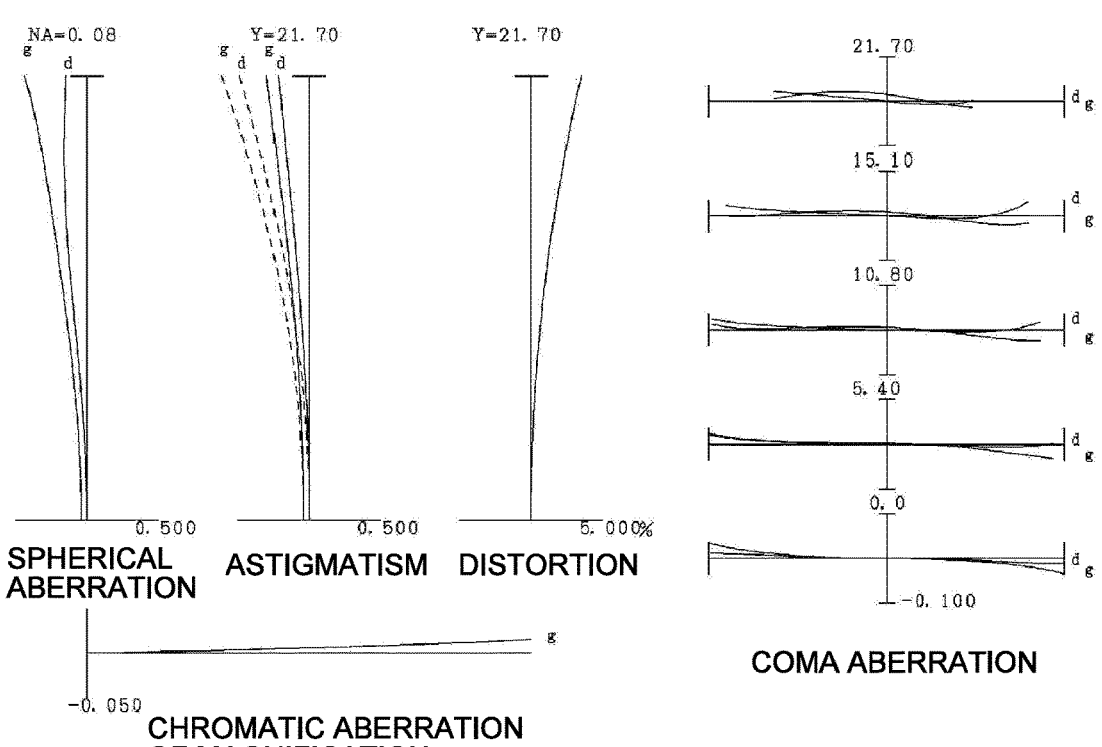

FIGS. 5A and 5B are graphs respectively showing various aberrations of the zoom optical system according to the second example upon focusing on infinity in the wide angle end state and the telephoto end state. FIGS. 6A and 6B are graphs respectively showing various aberrations of the zoom optical system according to the second example upon focus ing on a short distance object in the wide angle end state and the telephoto end state.

The graphs showing various aberrations exhibit that the zoom optical system according to the second example favorably corrects various aberrations and has an excellent imaging performance from the wide angle end state to the telephoto end state, and further has an excellent imaging performance also upon focusing on the short distance object.

Third Example

Figure 7:
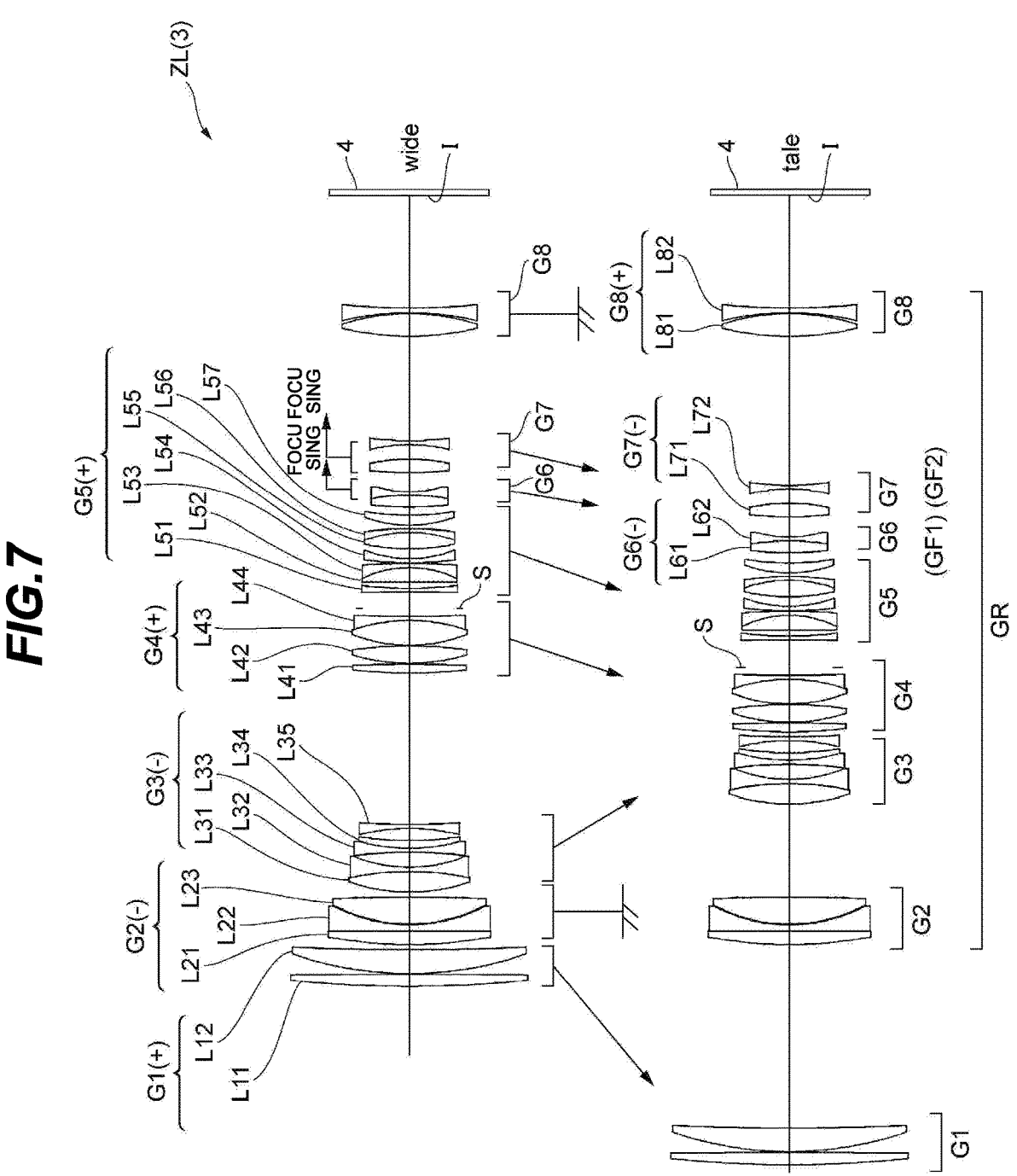
FIG. 7 shows a lens configuration of a zoom optical system according to a third example.

A third example is described with reference to FIGS. 7 to 9A and 9B and Table 3. FIG. 7 is a lens configuration diagram of a zoom optical system according to the third example. The zoom optical system ZL(3) according to the third example consists of, in order from the object: a first lens group G1 having a positive refractive power; a second lens group G2 having a negative refractive power; a third lens group G3 having a negative refractive power; a fourth lens group G4 having a positive refractive power; an aperture stop S; a fifth lens group G5 having a positive refractive power; a sixth lens group G6 having a negative refractive power; a seventh lens group G7 having a negative refractive power; and an eighth lens group G8 having a positive refractive power. Note that an imaging element 4 that includes an image surface I is disposed on the image-side of the eighth lens group G8.

Upon zooming from the wide angle end state (W) to the telephoto end state (T), the first lens group G1, and the third to seventh lens groups G3 to G7 move in the axial direction as indicated by arrows in FIG. 7, and the distances between lens groups adjacent to each other change. Note that the second and eighth lens groups G2 and G8 are fixed and stationary upon zooming. Note that the lens group that consists of the second to eighth lens groups G2 to G8 corresponds to the rear group GR.

The first lens group G1 consists of, in order from the object: a biconvex positive lens L11; and a positive meniscus lens L12 having a convex surface facing the object.

The second lens group G2 consists of, in order from the object: a cemented lens including a biconvex positive lens L21, and a biconcave negative lens L22; and a biconvex positive lens L23.

The third lens group G3 consists of, in order from the object: a cemented lens including a biconvex positive lens L31, and a biconcave negative lens L32; a cemented lens including a biconcave negative lens L33, and a positive meniscus lens L34 having a convex surface facing the object; and a biconcave negative lens L35.

The fourth lens group G4 consists of, in order from the object: a biconvex positive lens L41; a biconvex positive lens L42; a cemented lens including a biconvex positive lens L43, and a biconcave negative lens L44; and an aperture stop S. The aperture stop S is provided on the image-side of the fourth lens group G4, and moves with the fourth lens group G4 upon zooming.

The fifth lens group G5 consists of, in order from the object: a biconcave negative lens L51; a cemented lens including a positive meniscus lens L52 having a concave surface facing the object, and a negative meniscus lens L53 having a concave surface facing the object; a negative meniscus lens L54 having a convex surface facing the object; a cemented lens including a biconvex positive lens L55, and a negative meniscus lens L56 having a concave surface facing the object; and a positive meniscus lens L57 having a convex surface facing the object. Note that the cemented lens including the positive lens L55 and the negative meniscus lens L56 is a vibration proof lens controlled to move perpendicular to the optical axis. Camera shake correction and the like are performed by this lens.

The sixth lens group G6 consists of a cemented lens including a biconvex positive lens L61 and a biconcave negative lens L62. The sixth lens group G6 constitutes a first focusing lens group GF1 that is moved upon focusing.

The seventh lens group G7 consists of, in order from the object: a biconvex positive lens L71; and a biconcave negative lens L72. The seventh lens group G7 constitutes a second focusing lens group GF2 that is moved upon focusing.

The eighth lens group G8 consists of, in order from the object: a biconvex positive lens L81; and a biconcave negative lens L82.

In this example, as described above, the sixth lens group G6 constitutes the first focusing lens group GF1, and the seventh lens group G7 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 3 lists values of data on the zoom optical system according to the third example.

TABLE 3

| [General Data] | | | |
| --- | --- | --- | --- |
| | W | M | T |
| Entire Focal length f | 103.00 | 200.00 | 388.00 |
| Fno. | 4.62 | 5.10 | 5.93 |
| 2ω | 24.00 | 12.20 | 61.00 |
| Entire Length TL | 230.04 | 265.27 | 281.79 |
| Bf | 33.00 | 33.00 | 33.00 |

| [Lens Data] | | | |
| --- | --- | --- | --- |
| Surface | R | D | nd | νd |
| 1) | 326.0239 | 3.600 | 1.48749 | 70.32 |
| 2) | −2531.7885 | 0.150 | | |
| 3) | 103.1604 | 6.900 | 1.43385 | 95.23 |
| 4) | 771.4796 | | (d1) Variable | |
| 5) | 128.0909 | 3.800 | 1.66382 | 27.35 |

TABLE 3-continued

| | | | | |
|---|---|---|---|---|
| 6) | −4641.4566 | 1.900 | 1.79504 | 28.69 |
| 7) | 47.6457 | 0.200 | | |
| 8) | 46.7899 | 7.800 | 1.43385 | 95.23 |
| 9) | −598.3072 | (d2) Variable | | |
| 10) | 53.8787 | 5.900 | 1.73800 | 32.33 |
| 11) | −85.7204 | 1.300 | 1.49782 | 82.57 |
| 12) | 42.8717 | 4.324 | | |
| 13) | −128.8594 | 1.200 | 1.76385 | 48.49 |
| 14) | 55.5681 | 2.200 | 1.92286 | 20.88 |
| 15) | 101.6127 | 3.498 | | |
| 16) | −60.4530 | 1.200 | 1.76385 | 48.49 |
| 17) | 215.6397 | (d3) Variable | | |
| 18) | 142.7410 | 2.600 | 1.66382 | 27.35 |
| 19) | −420.7645 | 0.150 | | |
| 20) | 53.8491 | 5.200 | 1.43385 | 95.23 |
| 21) | −109.3350 | 0.150 | | |
| 22) | 46.0378 | 7.200 | 1.49782 | 82.57 |
| 23) | −49.5283 | 1.200 | 1.95000 | 29.37 |
| 24) | 463.7918 | 2.212 | | |
| 25) | 0.0000 | (d4) Variable | | Aperture stop S |
| 26) | −651.7880 | 1.200 | 1.66382 | 27.35 |
| 27) | 126.9388 | 1.737 | | |
| 28) | −1374.5057 | 4.200 | 1.74077 | 27.74 |
| 29) | −31.3985 | 1.200 | 1.49782 | 82.57 |
| 30) | −199.4701 | 0.200 | | |
| 31) | 116.4253 | 1.200 | 1.84666 | 23.80 |
| 32) | 34.9470 | 2.807 | | |
| 33) | 59.8644 | 4.800 | 1.63854 | 55.34 |
| 34) | −38.6623 | 1.100 | 1.90366 | 31.27 |
| 35) | −92.8568 | 1.000 | | |
| 36) | 38.1635 | 2.889 | 1.73800 | 32.33 |
| 37) | 76.6911 | (d5) Variable | | |
| 38) | 114.5396 | 3.414 | 1.85026 | 32.35 |
| 39) | −68.8190 | 1.100 | 1.76385 | 48.49 |
| 40) | 33.9421 | (d6) Variable | | |
| 41) | 103.0093 | 3.927 | 1.56732 | 42.58 |
| 42) | −55.6727 | 4.270 | | |
| 43) | −44.6064 | 1.100 | 1.76385 | 48.49 |
| 44) | 86.1100 | (d7) Variable | | |
| 45) | 81.9535 | 6.600 | 1.54814 | 45.51 |
| 46) | −63.9939 | 0.200 | 1.00000 | |
| 47) | −85.5518 | 1.400 | 1.63854 | 55.34 |
| 48) | 200.0000 | 31.498 | | |
| Image Surface (I) | ∞ | | | |

[Lens Group Data]

| Group | First surface | Focal length |
|---|---|---|
| f1 | 1 | 187.543 |
| f2 | 5 | −720.372 |
| f3 | 10 | −48.172 |
| f4 | 18 | 52.271 |
| f5 | 26 | 86.198 |
| f6 | 38 | −74.554 |
| f7 | 41 | −119.711 |
| f8 | 45 | 212.301 |

| | W invinity | M infinity | T infinity | W vicinity | M vicinity | T vicinity |
|---|---|---|---|---|---|---|
| | | | [Variable Distance Data] | | | |
| f(β) | 103.00000 | 199.99999 | 387.99992 | −0.12368 | −0.21526 | −0.38504 |
| (d1) | 1.50000 | 36.73173 | 53.24263 | 1.50000 | 36.73173 | 53.24263 |
| (d2) | 1.50000 | 17.74391 | 26.98619 | 1.50000 | 17.74391 | 26.98619 |
| (d3) | 44.06594 | 24.88658 | 1.50000 | 44.06594 | 24.88658 | 1.50000 |
| (d4) | 4.73843 | 3.68455 | 7.97230 | 4.73843 | 3.68455 | 7.97230 |
| (d5) | 2.41181 | 4.74774 | 3.02499 | 3.54963 | 12.36048 | 34.63431 |
| (d6) | 5.52851 | 3.22742 | 5.84898 | 13.54479 | 9.91379 | 4.31298 |
| (d7) | 30.27159 | 34.22471 | 43.18580 | 21.11779 | 19.92492 | 13.11421 |
| | | | [Each Group Magnification] | | | |
| G1 | 0.00000 | 0.00000 | 0.00000 | −0.33255 | −0.35479 | −0.36572 |
| G2 | 1.30482 | 1.22655 | 1.19301 | 1.47100 | 1.38326 | 1.34589 |
| G3 | −0.31483 | −0.59930 | −1.02540 | −0.17664 | −0.24924 | −0.30662 |
| G4 | −1.01142 | −1.13129 | −1.20593 | −1.16096 | −1.78143 | −5.99494 |
| G5 | 0.55159 | 0.52691 | 0.52816 | 0.52532 | 0.43628 | 0.20845 |

TABLE 3-continued

| | | | | | | |
|---|---|---|---|---|---|---|
| G6 | 1.88770 | 1.87779 | 1.95743 | 1.94316 | 1.88727 | 1.76927 |
| G7 | 1.57428 | 1.60729 | 1.68218 | 1.49782 | 1.48784 | 1.43099 |
| G8 | 0.80640 | 0.80640 | 0.80639 | 0.80639 | 0.80640 | 0.80638 |

| [Other Data] | |
|---|---|
| MWF1 | 1.137 |
| MTF1 | 31.607 |
| MWF2 | 9.154 |
| MTF2 | 30.071 |
| fF1 | −74.554 |
| fF2 | −119.711 |
| fR | 212.301 |
| dF1W | 90.810 |
| dF2W | 80.768 |
| IHw | 21.60 |

FIGS. 8A and 8B are graphs respectively showing various aberrations of the zoom optical system according to the third example upon focusing on infinity in the wide angle end state and the telephoto end state. FIGS. 9A and 9B are graphs respectively showing various aberrations of the zoom optical system according to the third example upon focusing on a short distance object in the wide angle end state and the telephoto end state.

The graphs showing various aberrations exhibit that the zoom optical system according to the third example favorably corrects various aberrations and has an excellent imaging performance from the wide angle end state to the telephoto end state, and further has an excellent imaging performance also upon focusing on the short distance object.

Fourth Example

A fourth example is described with reference to FIGS. 10 to 12A and 12B and Table 4. FIG. 10 is a lens configuration diagram of a zoom optical system according to the fourth example. The zoom optical system ZL(4) according to the fourth example consists of, in order from the object: a first lens group G1 having a positive refractive power; a second lens group G2 having a positive refractive power; a third lens group G3 having a negative refractive power; a fourth lens group G4 having a positive refractive power; a fifth lens group G5 having a positive refractive power; an aperture stop S disposed in the fifth lens group G5; a sixth lens group G6 having a negative refractive power; a seventh lens group G7 having a negative refractive power; and an eighth lens group G8 having a positive refractive power. Note that an imaging element 4 that includes an image surface I is disposed on the image-side of the eighth lens group G8.

Upon zooming from the wide angle end state (W) to the telephoto end state (T), the first lens group G1, and the third to seventh lens groups G3 to G7 move in the axial direction as indicated by arrows in FIG. 10, and the distances between lens groups adjacent to each other change. Note that the second and eighth lens groups G2 and G8 are fixed and stationary upon zooming. Note that the lens group that consists of the second to eighth lens groups G2 to G8 corresponds to the rear group GR.

The first lens group G1 comprises a biconvex positive lens L11.

The second lens group G2 consists of, in order from the object: a biconvex positive lens L21; a biconcave negative lens L22; and a biconvex positive lens L23.

The third lens group G3 consists of, in order from the object: a biconcave negative lens L31; a cemented lens including a biconcave negative lens L32, and a biconvex positive lens L33; and a biconcave negative lens L34.

The fourth lens group G4 consists of, in order from the object: a biconvex positive lens L41; and a cemented lens including a negative meniscus lens L42 having a convex surface facing the object, and a biconvex positive lens L43.

The fifth lens group G5 consists of, in order from the object: a positive meniscus lens L51 having a convex surface facing the object; a negative meniscus lens L52 having a concave surface facing the object; an aperture stop S; a positive meniscus lens L53 having a concave surface facing the object; a biconcave negative lens L54; a cemented lens including a biconvex positive lens L55, and a negative meniscus lens L56 having a concave surface facing the object; and a positive meniscus lens L57 having a convex surface facing the object. Note that the cemented lens including the positive lens L55 and the negative meniscus lens L56 is a vibration proof lens controlled to move perpendicular to the optical axis. Camera shake correction and the like are performed by this lens.

The sixth lens group G6 consists of a cemented lens including a biconvex positive lens L61 and a biconcave negative lens L62. The sixth lens group G6 constitutes a first focusing lens group GF1 that is moved upon focusing.

The seventh lens group G7 consists of, in order from the object: a biconvex positive lens L71; and a biconcave negative lens L72. The seventh lens group G7 constitutes a second focusing lens group GF2 that is moved upon focusing.

The eighth lens group G8 consists of, in order from the object: a positive meniscus lens L81 having a concave surface facing the object; and a biconcave negative lens L82.

In this example, as described above, the sixth lens group G6 constitutes the first focusing lens group GF1, and the seventh lens group G7 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 4 lists values of data on the zoom optical system according to the fourth example.

TABLE 4

| [General Data] | | | |
|---|---|---|---|
| | W | M | T |
| Entire Focal length f | 103.00 | 200.00 | 388.00 |
| Fno. | 4.62 | 4.82 | 5.77 |
| 2ω | 24.00 | 12.20 | 61.00 |
| Entire Length TL | 230.01 | 284.45 | 314.04 |
| Bf | 33.00 | 33.00 | 33.00 |

| [Lens Data] | | | | |
|---|---|---|---|---|
| Surface | R | D | nd | vd |
| 1) | 192.8854 | 6.000 | 1.48749 | 70.32 |
| 2) | −750.1515 | (d1) Variable | | |
| 3) | 61.9299 | 8.300 | 1.43385 | 95.23 |
| 4) | −300.7596 | 0.457 | | |
| 5) | −376.3860 | 1.800 | 1.83400 | 37.18 |
| 6) | 73.6276 | 0.200 | | |
| 7) | 62.1468 | 6.900 | 1.43385 | 95.23 |
| 8) | −617.4323 | (d2) Variable | | |
| 9) | −294.0488 | 1.300 | 1.49782 | 82.57 |
| 10) | 71.4570 | 3.656 | | |
| 11) | −159.4445 | 1.300 | 1.72916 | 54.61 |
| 12) | 48.2238 | 4.706 | 2.05090 | 26.94 |
| 13) | −538.4773 | 2.022 | | |
| 14) | −102.0759 | 1.300 | 1.69680 | 55.52 |
| 15) | 93.1021 | (d3) Variable | | |
| 16) | 88.5890 | 4.653 | 1.59319 | 67.90 |
| 17) | −103.6498 | 0.200 | | |
| 18) | 111.6169 | 1.400 | 1.95000 | 29.37 |
| 19) | 41.2387 | 5.254 | 1.59319 | 67.90 |
| 20) | −2808.9377 | (d4) Variable | | |
| 21) | 38.6339 | 3.547 | 1.73800 | 32.33 |
| 22) | 94.6995 | 3.719 | | |
| 23) | −68.9596 | 1.200 | 1.48749 | 70.32 |
| 24) | −132.6897 | 4.717 | | |
| 25) | 0.0000 | 2.189 | Aperture stop S | |
| 26) | −425.1177 | 2.506 | 1.74152 | 27.53 |
| 27) | −71.9852 | 0.200 | | |
| 28) | −274.8647 | 1.200 | 1.95981 | 26.42 |
| 29) | 39.6346 | 2.660 | | |
| 30) | 62.6805 | 5.213 | 1.67790 | 55.35 |
| 31) | −35.4953 | 1.100 | 1.83400 | 37.18 |
| 32) | −131.2644 | 1.000 | | |
| 33) | 65.3831 | 2.403 | 1.80261 | 25.03 |
| 34) | 212.9654 | (d5) Variable | | |
| 35) | 92.1132 | 2.938 | 1.83898 | 33.32 |
| 36) | −119.0260 | 1.100 | 1.76991 | 47.38 |
| 37) | 34.6476 | (d6) Variable | | |
| 38) | 460.6463 | 4.106 | 1.60342 | 38.03 |
| 39) | −42.7661 | 3.435 | | |
| 40) | −36.8112 | 1.100 | 1.76385 | 48.49 |
| 41) | 276.1876 | (d7) Variable | | |
| 42) | −596.8666 | 4.458 | 1.58553 | 39.69 |
| 43) | −59.0675 | 0.200 | | |
| 44) | −144.8232 | 1.500 | 1.48749 | 70.32 |
| 45) | 250.0331 | 33.000 | | |
| Image Surface (I) | ∞ | | | |

| [Lens Group Data] | | |
|---|---|---|
| Group | First surface | Focal length |
| f1 | 1 | 315.399 |
| f2 | 3 | 355.595 |
| f3 | 9 | −50.752 |
| f4 | 16 | 80.050 |
| f5 | 21 | 93.244 |
| f6 | 35 | −83.752 |
| f7 | 38 | −146.407 |
| f8 | 42 | 274.030 |

TABLE 4-continued

| | W infinity | M infinity | T infinity | W vicinity | M vicinity | T vicinity |
|---|---|---|---|---|---|---|
| | | | [Variable Distance Data] | | | |
| f(β) | 103.00000 | 200.00002 | 388.00008 | −0.12098 | −0.21181 | −0.40232 |
| (d1) | 1.50000 | 55.93241 | 85.52165 | 1.50000 | 55.93241 | 85.52165 |
| (d2) | 1.72737 | 14.90241 | 28.51234 | 1.72737 | 14.90241 | 28.51234 |
| (d3) | 52.98546 | 26.26922 | 1.50000 | 52.98546 | 26.26922 | 1.50000 |
| (d4) | 1.50000 | 12.04177 | 2.38454 | 1.50000 | 12.04177 | 2.38454 |
| (d5) | 4.39779 | 6.91374 | 2.00000 | 4.63443 | 15.13150 | 35.07688 |
| (d6) | 6.00747 | 3.80747 | 11.26079 | 23.18613 | 22.88699 | 7.78624 |
| (d7) | 28.96054 | 31.64459 | 49.92152 | 11.54533 | 4.34748 | 20.32252 |
| | | | [Each Group Magnification] | | | |
| G1 | 0.00000 | 0.00000 | 0.00000 | −0.69224 | −0.78613 | −0.84631 |
| G2 | 0.52622 | 0.57232 | 0.60094 | 0.39772 | 0.40907 | 0.41413 |
| G3 | −0.57284 | −0.85978 | −1.44008 | −0.37793 | −0.43349 | −0.49918 |
| G4 | −1.39092 | −1.76327 | −1.59842 | −1.67962 | −3.36864 | −34.38321 |
| G5 | 0.35195 | 0.32810 | 0.33223 | 0.32371 | 0.22593 | 0.03210 |
| G6 | 1.76819 | 1.75725 | 1.94419 | 1.86362 | 1.80747 | 1.73649 |
| G7 | 1.43053 | 1.44886 | 1.57369 | 1.31158 | 1.26241 | 1.37154 |
| G8 | 0.87491 | 0.87491 | 0.87491 | 0.87491 | 0.87491 | 0.87490 |

[Other Data]

| | |
|---|---|
| MWF1 | 0.236 |
| MTF1 | 33.073 |
| MWF2 | 17.415 |
| MTF2 | 29.598 |
| fF1 | −82.752 |
| fF2 | −146.407 |
| fR | 274.030 |
| dF1W | 86.805 |
| dF2W | 76.760 |
| IHw | 21.60 |

FIGS. 11A and 11B are graphs respectively showing various aberrations of the zoom optical system according to the fourth example upon focusing on infinity in the wide angle end state and the telephoto end state. FIGS. 12A and 12B are graphs respectively showing various aberrations of the zoom optical system according to the fourth example upon focusing on a short distance object in the wide angle end state and the telephoto end state.

The graphs showing various aberrations exhibit that the zoom optical system according to the fourth example favorably corrects various aberrations and has an excellent imaging performance from the wide angle end state to the telephoto end state, and further has an excellent imaging performance also upon focusing on the short distance object.

Fifth Example

A fifth example is described with reference to FIGS. 13 to 15A and 15B and Table 5. FIG. 13 is a lens configuration diagram of a zoom optical system according to the fifth example. The zoom optical system ZL(5) according to the fifth example consists of, in order from the object: a first lens group G1 having a positive refractive power; a second lens group G2 having a positive refractive power; a third lens group G3 having a negative refractive power; a fourth lens group G4 having a positive refractive power; a fifth lens group G5 having a positive refractive power; an aperture stop S; a sixth lens group G6 having a positive refractive power; a seventh lens group G7 having a negative refractive power; and an eighth lens group G8 having a negative refractive power. Note that an imaging element 4 that includes an image surface I is disposed on the image-side of the ninth lens group G9.

Upon zooming from the wide angle end state (W) to the telephoto end state (T), the first lens group G1, the third to fifth lens groups G3 to G5, and the seventh and eighth lens groups G7 and G8 move in the axial direction as indicated by arrows in FIG. 13, and the distances between lens groups adjacent to each other change. Note that the second, sixth and ninth lens groups G2, G6 and G9 are fixed and stationary upon zooming. Note that the lens group that consists of the second to ninth lens groups G2 to G9 corresponds to the rear group GR.

The first lens group G1 comprises a biconvex positive lens L11.

The second lens group G2 consists of, in order from the object: a positive meniscus lens L21 having a convex surface facing the object; a negative meniscus lens L22 having a convex surface facing the object; and a biconvex positive lens L23.

The third lens group G3 consists of, in order from the object: a biconcave negative lens L31; a cemented lens including a biconcave negative lens L32, and a biconvex positive lens L33; and a biconcave negative lens L34.

The fourth lens group G4 consists of, in order from the object: a biconvex positive lens L41; and a biconvex positive lens L42.

The fifth lens group G5 consists of, in order from the object: a positive meniscus lens L51 having a convex surface facing the object; a plano-concave lens L52 having a concave surface facing the object, and a planar surface facing the image; and an aperture stop S. The aperture stop S is provided on the image-side of the fifth lens group G5, and moves with the fifth lens group G5 upon zooming.

The sixth lens group G6 consists of, in order from the object: a negative meniscus lens L61 having a convex surface facing the object; a cemented lens including a biconvex positive lens L62 and a negative meniscus lens L63 having a concave surface facing the object; and a positive meniscus lens L64 having a convex surface facing the object. Note that the cemented lens including the positive lens L62 and the negative meniscus lens L63 is a vibration proof lens controlled to move perpendicular to the optical axis. Camera shake correction and the like are performed by this lens.

The seventh lens group G7 consists of, in order from the object: a biconvex positive lens L71; and a biconcave negative lens L72. The seventh lens group G7 constitutes a first focusing lens group GF1 that is moved upon focusing.

The eighth lens group G8 consists of, in order from the object: a positive meniscus lens L81 having a concave surface facing the object; and a negative meniscus lens L82 having a concave surface facing the object. The eighth lens group G8 constitutes a second focusing lens group GF2 that is moved upon focusing.

The ninth lens group G9 consists of a positive meniscus lens L91 having a convex surface facing the object.

In this example, as described above, the seventh lens group G7 constitutes the first focusing lens group GF1, and the eighth lens group G8 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 5 lists values of data on the zoom optical system according to the fifth example.

TABLE 5

[General Data]

|  | W | M | T |
|---|---|---|---|
| Entire Focal length f | 103.00 | 200.00 | 388.00 |
| Fno. | 4.72 | 4.81 | 5.83 |
| 2ω | 24.00 | 12.20 | 61.00 |
| Entire Length TL | 230.03 | 283.98 | 313.42 |
| Bf | 32.80 | 32.80 | 32.80 |

[Lens Data]

| Surface | R | D | nd | νd |
|---|---|---|---|---|
| 1) | 151.7547 | 7.100 | 1.48749 | 70.32 |
| 2) | −2673.8763 | (d1) Variable | | |
| 3) | 54.3416 | 6.900 | 1.43385 | 95.23 |
| 4) | 395.2695 | 0.200 | | |
| 5) | 254.9799 | 1.800 | 1.83400 | 37.18 |
| 6) | 43.7519 | 0.400 | | |
| 7) | 43.1697 | 8.300 | 1.43385 | 95.23 |
| 8) | −1349.8686 | (d2) Variable | | |
| 9) | −103.4436 | 1.300 | 1.49782 | 82.57 |
| 10) | 45.2178 | 3.581 | | |
| 11) | −607.4954 | 1.400 | 1.77250 | 49.62 |
| 12) | 41.2183 | 4.653 | 2.05090 | 26.94 |
| 13) | −2240.9221 | 2.123 | | |
| 14) | −96.4829 | 1.300 | 1.72916 | 54.61 |
| 15) | 190.6832 | (d3) Variable | | |
| 16) | 73.4321 | 4.060 | 1.49700 | 81.54 |
| 17) | −1221.9977 | 0.200 | | |
| 18) | 55.1976 | 5.041 | 1.49700 | 81.54 |
| 19) | −504.0704 | (d4) Variable | | |
| 20) | 47.1382 | 3.732 | 1.49782 | 82.57 |
| 21) | 128.8291 | 2.813 | | |
| 22) | −148.5282 | 1.400 | 1.48749 | 70.32 |
| 23) | 0.0000 | 3.000 | | |
| 24) | 0.0000 | (d5) Variable | | Aperture stop S |
| 25) | 84.8184 | 1.300 | 2.00069 | 25.46 |
| 26) | 34.6177 | 3.118 | | |
| 27) | 58.2700 | 6.750 | 1.60300 | 65.44 |
| 28) | −34.7763 | 1.200 | 1.83400 | 37.18 |
| 29) | −82.9878 | 1.000 | | |
| 30) | 40.7807 | 2.934 | 1.73800 | 32.33 |
| 31) | 79.4208 | (d6) Variable | | |
| 32) | 94.9267 | 3.861 | 1.72825 | 28.38 |
| 33) | −59.6113 | 0.724 | | |
| 34) | −60.2546 | 1.100 | 1.83481 | 42.73 |
| 35) | 38.9513 | (d7) Variable | | |
| 36) | −97.7819 | 2.750 | 1.68893 | 31.16 |
| 37) | −49.0112 | 9.017 | | |
| 38) | −38.4972 | 1.100 | 1.83481 | 42.73 |
| 39) | −242.2994 | (d8) Variable | | |

TABLE 5-continued

| | | | | |
|---|---|---|---|---|
| 40) | 94.7874 | 4.134 | 1.64769 | 33.72 |
| 41) | 2526.6166 | 32.800 | | |
| Image Surface (I) | ∞ | | | |

[Lens Group Data]

| Group | First surface | Focal length |
|---|---|---|
| f1 | 1 | 294.822 |
| f2 | 3 | 543.345 |
| f3 | 9 | −45.022 |
| f4 | 16 | 59.149 |
| f5 | 20 | 272.824 |
| f6 | 25 | 134.161 |
| f7 | 32 | −69.349 |
| f8 | 36 | −99.312 |
| f9 | 40 | 151.950 |

| | W infinity | M infinity | T infinity | W vicinity | M vicinity | T vicinity |
|---|---|---|---|---|---|---|

[Variable Distance Data]

| | W infinity | M infinity | T infinity | W vicinity | M vicinity | T vicinity |
|---|---|---|---|---|---|---|
| f(β) | 102.99981 | 199.99999 | 388.00004 | −0.12335 | −0.21579 | −0.35353 |
| (d1) | 1.50000 | 55.44587 | 84.89443 | 1.50000 | 55.44587 | 84.89443 |
| (d2) | 2.96781 | 20.63888 | 36.57284 | 2.96781 | 20.63888 | 36.57284 |
| (d3) | 45.17538 | 22.60012 | 1.50000 | 45.17538 | 22.60012 | 1.50000 |
| (d4) | 1.50000 | 7.15032 | 1.50000 | 1.50000 | 7.15032 | 1.50000 |
| (d5) | 2.24588 | 1.50000 | 12.31617 | 2.24588 | 1.50000 | 12.31617 |
| (d6) | 2.45752 | 7.49567 | 2.15559 | 2.82352 | 12.81613 | 31.04627 |
| (d7) | 11.49365 | 4.20368 | 11.07534 | 21.11963 | 17.91064 | 12.50182 |
| (d8) | 31.59668 | 33.84837 | 32.31708 | 21.60474 | 14.82097 | 2.00001 |

[Each Group Magnification]

| | W infinity | M infinity | T infinity | W vicinity | M vicinity | T vicinity |
|---|---|---|---|---|---|---|
| G1 | 0.00000 | 0.00000 | 0.00000 | −0.61964 | −0.69876 | −0.75102 |
| G2 | 0.63861 | 0.68184 | 0.70800 | 0.52573 | 0.54178 | 0.54947 |
| G3 | −0.39381 | −0.61536 | −1.04670 | −0.25630 | −0.30162 | −0.34860 |
| G4 | −1.04431 | −1.34311 | −1.39640 | −1.17246 | −1.97732 | −5.41243 |
| G5 | 0.69019 | 0.66982 | 0.65565 | 0.67721 | 0.61333 | 0.41738 |
| G6 | 0.73279 | 0.70839 | 0.73538 | 0.71887 | 0.65509 | 0.54219 |
| G7 | 1.97444 | 1.87994 | 1.97184 | 2.06254 | 1.97813 | 1.81819 |
| G8 | 1.73678 | 1.75945 | 1.74404 | 1.63617 | 1.56785 | 1.43877 |
| G9 | 0.76700 | 0.76700 | 0.76699 | 0.76700 | 0.76700 | 0.76700 |

[Other Data]

| | |
|---|---|
| MWF1 | 0.366 |
| MTF1 | 28.891 |
| MWF2 | 9.992 |
| MTF2 | 30.317 |
| fF1 | −69.349 |
| fF2 | −99.312 |
| fR | 151.950 |
| dF1W | 98.577 |
| dF2W | 81.398 |
| IHw | 21.60 |

FIGS. 14A and 14B are graphs respectively showing various aberrations of the zoom optical system according to the fifth example upon focusing on infinity in the wide angle end state and the telephoto end state. FIGS. 15A and 15B are graphs respectively showing various aberrations of the zoom optical system according to the fifth example upon focusing on a short distance object in the wide angle end state and the telephoto end state.

The graphs showing various aberrations exhibit that the zoom optical system according to the fifth example favorably corrects various aberrations and has an excellent imaging performance from the wide angle end state to the telephoto end state, and further has an excellent imaging performance also upon focusing on the short distance object.

Sixth Example

A sixth example is described with reference to FIGS. 16 to 18A and 18B and Table 6. FIG. 16 is a lens configuration diagram of a zoom optical system according to the sixth example. The zoom optical system ZL(6) according to the sixth example consists of, in order from the object: a first lens group G1 having a positive refractive power; a second lens group G2 having a positive refractive power; a third lens group G3 having a negative refractive power; a fourth lens group G4 having a positive refractive power; a fifth lens group G5 having a positive refractive power; an aperture stop S; a sixth lens group G6 having a positive refractive power; a seventh lens group G7 having a negative refractive power; an eighth lens group G8 having a negative refractive power; and a ninth lens group G9 having a positive refractive power. Note that an imaging element 4 that includes an image surface I is disposed on the image-side of the ninth lens group G9.

Upon zooming from the wide angle end state (W) to the telephoto end state (T), the first to fifth lens groups G1 to G5, and the seventh and eighth lens groups G7 and G8 move in the axial direction as indicated by arrows in FIG. 16, and the distances between lens groups adjacent to each other change. Note that the sixth and ninth lens groups G6 and G9 are fixed and stationary upon zooming. Note that the lens group that consists of the second to ninth lens groups G2 to G9 corresponds to the rear group GR.

The first lens group G1 consists of a positive meniscus lens L11 having a convex surface facing the object.

The second lens group G2 consists of, in order from the object: a positive meniscus lens L21 having a convex surface facing the object; a negative meniscus lens L22 having a convex surface facing the object; and a biconvex positive lens L23.

The third lens group G3 consists of, in order from the object: a biconcave negative lens L31; a cemented lens including a biconcave negative lens L32, and a biconvex positive lens L33; and a biconcave negative lens L34.

The fourth lens group G4 consists of, in order from the object: a biconvex positive lens L41; and a biconvex positive lens L42.

The fifth lens group G5 consists of, in order from the object: a positive meniscus lens L51 having a convex surface facing the object; a negative meniscus lens L52 having a concave surface facing the object; and an aperture stop S. The aperture stop S is provided on the image-side of the fifth lens group G5, and moves with the fifth lens group G5 upon zooming.

The sixth lens group G6 consists of, in order from the object: a negative meniscus lens L61 having a convex surface facing the object; a cemented lens including a biconvex positive lens L62 and a negative meniscus lens L63 having a concave surface facing the object; and a positive meniscus lens L64 having a convex surface facing the object. Note that the cemented lens including the positive lens L62 and the negative meniscus lens L63 is a vibration proof lens controlled to move perpendicular to the optical axis. Camera shake correction and the like are performed by this lens.

The seventh lens group G7 consists of, in order from the object: a biconvex positive lens L71; and a biconcave negative lens L72. The seventh lens group G7 constitutes a first focusing lens group GF1 that is moved upon focusing.

The eighth lens group G8 consists of, in order from the object: a positive meniscus lens L81 having a concave surface facing the object; and a negative meniscus lens L82 having a concave surface facing the object. The eighth lens group G8 constitutes a second focusing lens group GF2 that is moved upon focusing.

The ninth lens group G9 comprises a biconvex positive lens L91.

In this example, as described above, the seventh lens group G7 constitutes the first focusing lens group GF1, and the eighth lens group G8 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 6 lists values of data on the zoom optical system according to the sixth example.

TABLE 6

| [General Data] | | | |
|---|---|---|---|
| | W | M | T |
| Entire Focal length f | 103.00 | 200.00 | 388.00 |
| Fno. | 4.79 | 4.83 | 5.83 |
| 2ω | 24.00 | 12.20 | 61.00 |
| Entire Length TL | 230.02 | 283.37 | 310.00 |
| Bf | 32.80 | 32.80 | 32.80 |

| [Lens Data] | | | | |
|---|---|---|---|---|
| Surface | R | D | nd | νd |
| 1) | 125.9920 | 7.500 | 1.48749 | 70.32 |
| 2) | 2337.2446 | | (d1) Variable | |
| 3) | 56.6122 | 6.700 | 1.43385 | 95.23 |
| 4) | 405.7473 | 0.200 | | |
| 5) | 285.7363 | 1.800 | 1.83400 | 37.18 |
| 6) | 45.4031 | 0.400 | | |
| 7) | 45.3768 | 8.100 | 1.43385 | 95.23 |
| 8) | −985.4010 | | (d2) Variable | |
| 9) | −121.3238 | 1.300 | 1.49782 | 82.57 |
| 10) | 45.2460 | 3.913 | | |
| 11) | −219.1132 | 1.400 | 1.75500 | 52.33 |
| 12) | 41.5079 | 5.122 | 2.00100 | 29.12 |
| 13) | −205.7641 | 2.090 | | |
| 14) | −70.1006 | 1.300 | 1.72916 | 54.61 |
| 15) | 222.9918 | | (d3) Variable | |
| 16) | 68.7539 | 4.155 | 1.49700 | 81.54 |
| 17) | −1376.4126 | 0.200 | | |
| 18) | 70.8280 | 4.774 | 1.49700 | 81.54 |

TABLE 6-continued

| | | | | | |
|---|---|---|---|---|---|
| 19) | −198.7875 | | (d4) Variable | | |
| 20) | 50.2645 | 3.670 | 1.49782 | | 82.57 |
| 21) | 159.3159 | 2.838 | | | |
| 22) | −111.4927 | 1.400 | 1.48749 | | 70.32 |
| 23) | −1001.6428 | 3.000 | | | |
| 24) | 0.0000 | | (d5) Variable | | Aperture stop S |
| 25) | 118.9159 | 1.300 | 2.00069 | | 25.46 |
| 26) | 39.7302 | 2.777 | | | |
| 27) | 59.1890 | 6.750 | 1.60300 | | 65.44 |
| 28) | −33.1056 | 1.200 | 1.83400 | | 37.18 |
| 29) | −79.3818 | 1.000 | | | |
| 30) | 48.9629 | 3.035 | 1.73800 | | 32.33 |
| 31) | 135.6871 | | (d6) Variable | | |
| 32) | 144.8538 | 3.713 | 1.73800 | | 32.33 |
| 33) | −56.0133 | 1.018 | | | |
| 34) | −54.2284 | 1.100 | 1.77250 | | 49.62 |
| 35) | 40.7236 | | (d7) Variable | | |
| 36) | −78.3572 | 2.539 | 1.68893 | | 31.16 |
| 37) | −49.2437 | 10.535 | | | |
| 38) | −37.5910 | 1.100 | 1.76385 | | 48.49 |
| 39) | −159.9882 | | (d8) Variable | | |
| 40) | 121.2724 | 4.090 | 1.60342 | | 38.03 |
| 41) | −528.7246 | 32.801 | | | |
| Image Surface (I) | ∞ | | | | |

[Lens Group Data]

| Group | First surface | Focal length |
|---|---|---|
| f1 | 1 | 272.873 |
| f2 | 3 | 669.663 |
| f3 | 9 | −44.567 |
| f4 | 16 | 59.598 |
| f5 | 20 | 318.669 |
| f6 | 25 | 120.008 |
| f7 | 32 | −71.109 |
| f8 | 36 | −105.879 |
| f9 | 40 | 163.866 |

| | W infinity | M infinity | T infinity | W vicinity | M vicinity | T vicinity |
|---|---|---|---|---|---|---|

[Variable Distance Data]

| | W infinity | M infinity | T infinity | W vicinity | M vicinity | T vicinity |
|---|---|---|---|---|---|---|
| f(β) | 102.99713 | 199.99997 | 387.99998 | −0.12317 | −0.21440 | −0.35034 |
| (d1) | 1.50000 | 51.41466 | 74.36616 | 1.50000 | 51.41466 | 74.36616 |
| (d2) | 2.78743 | 21.86893 | 38.13088 | 2.78743 | 21.86893 | 38.13088 |
| (d3) | 43.10977 | 22.50550 | 1.50000 | 43.10977 | 22.50550 | 1.50000 |
| (d4) | 1.50000 | 7.74332 | 4.48521 | 1.50000 | 7.74332 | 4.48521 |
| (d5) | 2.78339 | 1.50000 | 13.17816 | 2.78339 | 1.50000 | 13.17816 |
| (d6) | 2.91369 | 7.23970 | 2.04512 | 3.29693 | 12.62563 | 30.72211 |
| (d7) | 11.77968 | 4.36491 | 10.41687 | 21.89229 | 8.24680 | 12.74366 |
| (d8) | 30.82578 | 33.91392 | 33.05806 | 20.33048 | 14.64601 | 2.05695 |

[Each Group Magnification]

| | W infinity | M infinity | T infinity | W vicinity | M vicinity | T vicinity |
|---|---|---|---|---|---|---|
| G1 | 0.00000 | 0.00000 | 0.00000 | −0.54863 | −0.61447 | −0.65309 |
| G2 | 0.69930 | 0.73775 | 0.75689 | 0.60476 | 0.62272 | 0.63000 |
| G3 | −0.38151 | −0.61911 | −1.03867 | −0.24742 | −0.29907 | −0.34849 |
| G4 | −1.11481 | −1.37180 | −1.44873 | −1.25512 | −2.04228 | −5.74217 |
| G5 | 0.71125 | 0.69713 | 0.68538 | 0.69822 | 0.64109 | 0.44208 |
| G6 | 0.68417 | 0.66234 | 0.69266 | 0.66835 | 0.60291 | 0.47853 |
| G7 | 1.97284 | 1.88369 | 1.96468 | 2.05944 | 1.97503 | 1.81525 |
| G8 | 1.67943 | 1.70857 | 1.70053 | 1.58030 | 1.52660 | 1.40770 |
| G9 | 0.78714 | 0.78715 | 0.78714 | 0.78715 | 0.78715 | 0.78715 |

[Other Data]

| | |
|---|---|
| MWF1 | 0.383 |
| MTF1 | 28.677 |
| MWF2 | 10.496 |
| MTF2 | 31.004 |
| fF1 | −71.109 |
| fF2 | −105.879 |
| fR | 163.866 |
| dF1W | 99.500 |
| dF2W | 81.889 |
| IHw | 21.60 |

FIGS. 17A and 17B are graphs respectively showing various aberrations of the zoom optical system according to the sixth example upon focusing on infinity in the wide angle end state and the telephoto end state. FIGS. 18A and 18B are graphs respectively showing various aberrations of the zoom optical system according to the sixth example upon focusing on a short distance object in the wide angle end state and the telephoto end state.

The graphs showing various aberrations exhibit that the zoom optical system according to the sixth example favorably corrects various aberrations and has an excellent imaging performance from the wide angle end state to the telephoto end state, and further has an excellent imaging performance also upon focusing on the short distance object.

Lastly, the table of [Conditional Expression Corresponding Value] is shown below. This table collectively indicates values corresponding to the conditional expressions (1) to (17) with respect to all the examples (first to sixth examples).

Conditional expression (1) $0.000 < (MWF1/MTF1)/(MWF2/MTF2) < 0.500$
Conditional expression (2) $0.00 < MWF1/MWF2 < 0.50$
Conditional expression (3) $0.50 < MTF1/MTF2 < 1.50$
Conditional expression (4) $0.30 < fF1/fF2 < 1.50$
Conditional expression (5) $0.20 < fF1p/(-fF1) < 2.00$
Conditional expression (6) $0.20 < fF2p/(-fF2) < 2.00$
Conditional expression (7) $0.20 < (-fF2)/fR < 1.00$
Conditional expression (8) $0.20 < dF1w/TLw < 0.50$
Conditional expression (9) $0.20 < dF2w/TLw < 0.50$
Conditional expression (10) $1.00 < Bfw/IHw < 4.00$
Conditional expression (11) $0.10 < 1/\beta WF1 < 1.00$
Conditional expression (12) $0.10 < 1/\beta WF2 < 1.00$
Conditional expression (13) $0.05 < (\beta WF1 + 1/\beta FWF1)^{-2} < 0.25$
Conditional expression (14) $0.05 < (\beta WF2 + 1/\beta FWF2)^{-2} < 0.25$
Conditional expression (15) $50.0 < 2\omega w$
Conditional expression (16) $2.00 < ft/fw < 8.00$
Conditional expression (17) $0.70 < ft/TLt < 2.00$ Conditional Expression Corresponding Value First~Third Example

| Conditional Expression | First Example | Second Example | Third Example |
|---|---|---|---|
| (1) | 0.086 | 0.107 | 0.118 |
| (2) | 0.090 | 0.110 | 0.124 |
| (3) | 1.045 | 1.028 | 1.051 |
| (4) | 0.938 | 0.813 | 0.623 |
| (5) | 0.622 | 0.785 | 0.684 |
| (6) | 0.635 | 0.601 | 0.537 |
| (7) | 0.468 | 0.474 | 0.564 |
| (8) | 0.391 | 0.388 | 0.395 |
| (9) | 0.333 | 0.356 | 0.351 |
| (10) | 1.445 | 1.458 | 1.528 |
| (11) | 0.593 | 0.587 | 0.530 |
| (12) | 0.569 | 0.563 | 0.511 |
| (13) | 0.193 | 0.191 | 0.171 |
| (14) | 0.185 | 0.183 | 0.164 |
| (15) | 24.00 | 24.00 | 24.00 |
| (16) | 3.77 | 3.77 | 3.77 |
| (17) | 1.38 | 1.41 | 1.38 |

Conditional Expression Corresponding Value

Fourth~Sixth Example

| Conditional Expression | Fourth Example | Fifth Example | Sixth Example |
|---|---|---|---|
| (1) | 0.012 | 0.038 | 0.039 |
| (2) | 0.014 | 0.037 | 0.036 |
| (3) | 1.117 | 0.953 | 0.925 |
| (4) | 0.565 | 0.698 | 0.672 |
| (5) | 0.753 | 0.733 | 0.776 |
| (6) | 0.444 | 1.404 | 1.755 |
| (7) | 0.534 | 0.654 | 0.646 |
| (8) | 0.377 | 0.429 | 0.433 |
| (9) | 0.334 | 0.354 | 0.356 |
| (10) | 1.528 | 1.519 | 1.519 |
| (11) | 0.566 | 0.506 | 0.507 |
| (12) | 0.514 | 0.507 | 0.509 |
| (13) | 0.184 | 0.162 | 0.163 |
| (14) | 0.165 | 0.163 | 0.163 |
| (15) | 24.00 | 24.00 | 24.00 |
| (16) | 3.77 | 3.77 | 3.77 |
| (17) | 1.24 | 1.24 | 1.25 |

The first to sixth examples described above show specific examples of this embodiment. This embodiment is not limited to these examples.

Note that the following content can be adopted in a range without impairing the optical performance of the zoom optical system according to this embodiment.

As numerical examples of the zoom optical systems, those having the seven- to nine-group structures are described. However, the present application is not limited thereto. A zoom optical system having another group configuration (e.g., a ten-group structure etc.) may be configured. Specifically, a configuration may be adopted where a lens or a lens group is added to a place closest to the object or a place closest to the image surface in the zoom optical system. Note that the lens group indicates a portion that includes at least one lens separated by air distances that change during zooming.

The lens surface may be made of a spherical surface or a planar surface, or an aspherical surface. A case where the lens surface is a spherical surface or a planar surface is preferable, because lens processing, and assembling and adjustment are facilitated, and the optical performance degradation due to errors caused by processing and assembling and adjustment can be prevented. It is also preferable because the degradation in representation performance even with the image surface being misaligned is small.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

As to the aperture stop, a member as the aperture stop is not necessarily provided, and a lens frame may replace the member to function alternatively.

An antireflection film having a high transmissivity in a wide wavelength region may be applied onto each lens surface in order to reduce flares and ghosts and achieve optical performances having a high contrast. This can reduce flares and ghosts, and achieve optical performances having a high contrast.

<div align="center">

EXPLANATION OF NUMERALS AND CHARACTERS

</div>

| | |
|---|---|
| G1 First lens group | G2 Second lens group |
| G3 Third lens group | G4 Fourth lens group |
| G5 Fifth lens group | G6 Sixth lens group |
| G7 Seventh lens group | G8 Eighth lens group |
| G9 Ninth lens group | |
| GR Rear group | S Aperture stop |
| GF1 First focusing lens group | GF2 Second focusing lens group |
| I Image surface | 4 Imaging element |

The invention claimed is:

1. A zoom optical system consisting of, in order from an object on an optical axis: a first lens group having a positive refractive power; and a rear group that includes a plurality of lens groups, wherein upon zooming from a wide angle end to a telephoto end, a distance between the first lens group and the rear group changes, and distances between lens groups constituting the rear group change, the rear group includes, in order from the object: a first focusing lens group having a negative refractive power; and a second focusing lens group having a negative refractive power, both the first focusing lens group and the second focusing lens group move on the optical axis toward an image upon focusing from infinity to a short distance position, and the following conditional expression is satisfied:

$$0.30 < fF1/fF2 \le 0.672$$

where fF1: a focal length of the first focusing lens group, and fF2: a focal length of the second focusing lens group.

2. The zoom optical system according to claim 1, wherein the following conditional expression is satisfied:

$$0.20 < (-fF2)/fR < 1.00$$

where fR: a combined focal length of lens groups positioned closer to the image than the second focusing lens group, and fF2: a focal length of the second focusing lens group.

3. The zoom optical system according to claim 1, wherein the following conditional expression is satisfied:

$$0.20 < dF1w/TLw < 0.50$$

where dF1w: a distance from an object-side lens surface of the first focusing lens group to an image surface upon focusing on infinity in the wide angle end state, and TLw: an entire length of the optical system in the wide angle end state.

4. The zoom optical system according to claim 1, wherein the following conditional expression is satisfied:

$$0.20 < dF2w/TLw < 0.50$$

where dF2w: a distance from an object-side lens surface of the second focusing lens group to an image surface upon focusing on infinity in the wide angle end state, and TLw: an entire length of the optical system in the wide angle end state.

5. The zoom optical system according to claim 1, wherein the following conditional expression is satisfied:

$$1.00 < Bfw/IHw < 4.00$$

where

Bfw: a back focus length in the wide angle end state, and

IHw: an image height in the wide angle end state.

6. The zoom optical system according to claim 1, wherein the following conditional expression is satisfied:

$$50.0° < 2\omega w$$

where $2\omega w$: a full angle of view (°) in the wide angle end state.

7. The zoom optical system according to claim 1, wherein the following conditional expression is satisfied:

$$2.00 < ft/fw < 8.00$$

where ft: a focal length of the entire optical system upon focusing on infinity in the telephoto end state, and fw: a focal length of the entire optical system upon focusing on infinity in the wide angle end state.

8. The zoom optical system according to claim 1, wherein the following conditional expression is satisfied:

$$0.70 < ft/TLt < 2.00$$

where

TLt: an entire length of the optical system in the telephoto end state, and ft: a focal length of the entire optical system upon focusing on infinity in the telephoto end state.

9. An optical apparatus comprising the zoom optical system according to claim 1.

10. A method for manufacturing a zoom optical system consisting of, in order from an object on an optical axis: a first lens group having a positive refractive power; and a rear group that includes a plurality of lens groups, the method comprising disposing the first lens group and the rear group in a lens barrel in order from the object on the optical axis so that:

upon zooming from a wide angle end to a telephoto end, a distance between the first lens group and the rear group changes, and distances between lens groups constituting the rear group change, the rear group includes, in order from the object: a first focusing lens group having a negative refractive power; and a second focusing lens group having a negative refractive power, and both the first focusing lens group and the second focusing lens group move on the optical axis toward an image upon focusing from infinity to a short distance position, the method further comprising one of the following features A and B:

the feature A comprising:

satisfying the following conditional expression:

$$0.30 < fF1/fF2 \le 0.672$$

where fF1: a focal length of the first focusing lens group, and fF2: a focal length of the second focusing lens group, and the feature B comprising:

the rear group comprises at least four lens groups which are disposed closer to the object than the first focusing lens group, and satisfying the following conditional expression:

$$0.30 < fF1/fF2 < 1.50$$

where fF1: a focal length of the first focusing lens group, and fF2: a focal length of the second focusing lens group.

11. A zoom optical system consisting of, in order from an object on an optical axis: a first lens group having a positive refractive power; and a rear group that includes a plurality of lens groups, wherein upon zooming from a wide angle end to a telephoto end, a distance between the first lens group and the rear group changes, and distances between lens groups constituting the rear group change, the rear group includes a first focusing lens group having a negative refractive power, and a second focusing lens group having a negative refractive power, which is disposed closer to an image than the first focusing lens group, the rear group comprises at least four lens groups which are disposed closer to the object than the first focusing lens group, both the first focusing lens group and the second focusing lens group move on the optical axis toward an image upon focusing from infinity to a short distance position, and the following conditional expression is satisfied:

$$0.30 < fF1/fF2 < 1.50$$

where fF1: a focal length of the first focusing lens group, and fF2: a focal length of the second focusing lens group.

12. The zoom optical system according to claim 11, wherein:

the at least four lens groups which are disposed closer to the object than the first focusing lens group in the rear group are, in order from the object on the optical axis, a lens group having a negative refractive power, a lens group having a negative refractive power, a lens group having a positive refractive power, and a lens group having a positive refractive power, or the at least four lens groups which are disposed closer to the object than the first focusing lens group in the rear group are, in order from the object on the optical axis, a lens group having a positive refractive power, a lens group having a negative refractive power, a lens group having a positive refractive power, and a lens group having a positive refractive power, or the at least four lens groups which are disposed closer to the object than the first focusing lens group in the rear group are, in order from the object on the optical axis, a lens group having a positive refractive power, a lens group having a negative refractive power, a lens group having a positive refractive power, a lens group having a positive refractive power, and a lens group having a positive refractive power.

13. The zoom optical system according to claim 11, wherein the following conditional expression is satisfied:

$$0.20 < (-fF2)/fR < 1.00$$

where fR: a combined focal length of lens groups positioned closer to the image than the second focusing lens group, and fF2: a focal length of the second focusing lens group.

14. The zoom optical system according to claim 11, wherein the following conditional expression is satisfied:

$$0.20 < dF1w/TLw < 0.50$$

where dF1w: a distance from an object-side lens surface of the first focusing lens group to an image surface upon focusing on infinity in the wide angle end state, and TLw: an entire length of the optical system in the wide angle end state.

15. The zoom optical system according to claim 11, wherein the following conditional expression is satisfied:

$$0.20 < dF2w/TLw < 0.50$$

where dF2w: a distance from an object-side lens surface of the second focusing lens group to an image surface upon focusing on infinity in the wide angle end state, and TLw: an entire length of the optical system in the wide angle end state.

16. The zoom optical system according to claim 11, wherein the following conditional expression is satisfied:

$$1.00 < Bfw/IHw < 4.00$$

where

Bfw: a back focus length in the wide angle end state, and

IHw: an image height in the wide angle end state.

17. The zoom optical system according to claim 11, wherein the following conditional expression is satisfied:

$$50.0° < 2\omega w$$

where

2ωw: a full angle of view (°) in the wide angle end state.

18. The zoom optical system according to claim 11, wherein the following conditional expression is satisfied:

$$2.00 < ft/fw < 8.00$$

where ft: a focal length of the entire optical system upon focusing on infinity in the telephoto end state, and fw: a focal length of the entire optical system upon focusing on infinity in the wide angle end state.

19. The zoom optical system according to claim 11, wherein the following conditional expression is satisfied:

$$0.70 < ft/TLt < 2.00$$

where

TLt: an entire length of the optical system in the telephoto end state, and ft: a focal length of the entire optical system upon focusing on infinity in the telephoto end state.

* * * * *